United States Patent
Park et al.

(10) Patent No.: US 10,296,165 B2
(45) Date of Patent: May 21, 2019

(54) MOBILE TERMINAL INCLUDING DISPLAY ON FRONT SURFACE AND REAR INPUT UNIT ON REAR SURFACE AND METHOD FOR OPERATING MOBILE TERMINAL BASED ON FIRST INPUT APPLIED TO REAR INPUT UNIT AND SECOND INPUT APPLIED TO DISPLAY

(71) Applicant: LG ELECTRONICS INC., Seoul (KR)

(72) Inventors: Jiyoung Park, Seoul (KR); Jaeho Choi, Seoul (KR); Sujin Kim, Seoul (KR); Sunghye Yoon, Seoul (KR); Jumin Chi, Seoul (KR); Sukhoon Noh, Seoul (KR); Younghoon Kim, Seoul (KR); Kyungjik Lee, Seoul (KR); Sangwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 15/100,942

(22) PCT Filed: Nov. 26, 2014

(86) PCT No.: PCT/KR2014/011440
§ 371 (c)(1),
(2) Date: Jun. 1, 2016

(87) PCT Pub. No.: WO2015/088166
PCT Pub. Date: Jun. 18, 2015

(65) Prior Publication Data
US 2016/0306524 A1 Oct. 20, 2016

(30) Foreign Application Priority Data

Dec. 10, 2013 (KR) .................. 10-2013-0153427
Dec. 10, 2013 (KR) .................. 10-2013-0153428

(51) Int. Cl.
*G06F 3/0482* (2013.01)
*G06F 3/0481* (2013.01)
(Continued)

(52) U.S. Cl.
CPC .......... *G06F 3/04817* (2013.01); *G06F 1/169* (2013.01); *G06F 1/1626* (2013.01);
(Continued)

(58) Field of Classification Search
CPC .... H04M 1/23; H04M 1/236; H04M 2250/22; H04B 1/38; G06F 3/041; G06F 3/02; G06F 3/04817; G06F 3/0488
See application file for complete search history.

(56) References Cited

U.S. PATENT DOCUMENTS

2003/0184528 A1* 10/2003 Kawasaki ........... G02F 1/13338
345/173
2009/0201260 A1* 8/2009 Lee ..................... G06F 3/04883
345/173
(Continued)

FOREIGN PATENT DOCUMENTS

KR         10-0832260        5/2008
KR      10-2008-0102503    11/2008
(Continued)

OTHER PUBLICATIONS

PCT International Application No. PCT/KR2014/011440, Notification of Transmittal of the International Search Report dated Mar. 10, 2016, 4 pages.

*Primary Examiner* — Rinna Yi
(74) *Attorney, Agent, or Firm* — Lee, Hong, Degerman, Kang & Waimey

(57) ABSTRACT

The present invention relates to a mobile terminal adapted to guide a plurality of functions, performable on the current screen, to a front display unit in accordance with user
(Continued)

interaction on a rear surface input unit, and relates to a method for operating the rear surface input unit of same, and the present invention comprises the steps of: displaying content on the front display unit; detecting a first input on the rear surface input unit; displaying, through a guide unit, at least one function performable on the current screen on the front display unit on the basis of the type of first input detected; and performing the function in accordance with a second input on the rear surface input unit.

15 Claims, 36 Drawing Sheets

(51) Int. Cl.

| | | |
|---|---|---|
| H04M 1/23 | (2006.01) | |
| G06F 3/0487 | (2013.01) | |
| G06F 3/0485 | (2013.01) | |
| G06F 3/0488 | (2013.01) | |
| G06F 3/0484 | (2013.01) | |
| G06F 3/0354 | (2013.01) | |
| G06F 1/16 | (2006.01) | |
| G06F 3/02 | (2006.01) | |
| G06T 11/60 | (2006.01) | |
| G06K 9/00 | (2006.01) | |

(52) U.S. Cl.
CPC ............ *G06F 3/02* (2013.01); *G06F 3/03547* (2013.01); *G06F 3/0485* (2013.01); *G06F 3/0487* (2013.01); *G06F 3/0488* (2013.01); *G06F 3/04842* (2013.01); *G06F 3/04847* (2013.01); *G06F 3/04883* (2013.01); *G06T 11/60* (2013.01); *H04M 1/236* (2013.01); *G06F 2203/04104* (2013.01); *G06F 2203/04804* (2013.01); *G06F 2203/04806* (2013.01); *G06K 9/00013* (2013.01)

(56) References Cited

U.S. PATENT DOCUMENTS

| | | | |
|---|---|---|---|
| 2013/0057489 A1 | 3/2013 | Morton et al. | |
| 2013/0069883 A1* | 3/2013 | Oga | G06F 1/1615 |
| | | | 345/172 |
| 2015/0095828 A1* | 4/2015 | Iida | G06F 3/04883 |
| | | | 715/771 |
| 2015/0126246 A1* | 5/2015 | Lombardi | G06F 3/041 |
| | | | 455/556.1 |

FOREIGN PATENT DOCUMENTS

| | | |
|---|---|---|
| KR | 20-2011-0001788 | 2/2011 |
| KR | 10-2011-0072220 | 6/2011 |

* cited by examiner

[VOLUME UP]

[ENLARGE TEXT]

[REDUCE TEXT]

[ENLARGE/REDUCE TEXT]

[TIME CONTROL]

[POWER ON]

[STANDBY SCREEN]

[LOCKED STATE]

[LOCKED STATE]

[LOCK RELEASE]

[ENLARGE PHOTO]

[PHOTO FLICKING]

[DISPLY FUNCTION INDICATOR]

[ZOOM IN(PRESS UP KEY)]

[DISPLAY ANOTHER MESSAGE(SCROLL CENTRAL BUTTON)]

[POWER ON]

MOBILE TERMINAL INCLUDING DISPLAY ON FRONT SURFACE AND REAR INPUT UNIT ON REAR SURFACE AND METHOD FOR OPERATING MOBILE TERMINAL BASED ON FIRST INPUT APPLIED TO REAR INPUT UNIT AND SECOND INPUT APPLIED TO DISPLAY

CROSS-REFERENCE TO RELATED APPLICATIONS

This application is the National Stage filing under 35 U.S.C. 371 of International Application No. PCT/KR2014/011440, filed on Nov. 26, 2014 which claims the benefit of earlier filing date and right of priority to Korean Application Nos. 10-2013-0153427, filed on Dec. 10, 2013 and 10-2013-0153428, filed on Dec. 10, 2013, the contents of which are all hereby incorporated by reference herein in their entireties.

BACKGROUND OF THE INVENTION

1. Field of the Invention

The present disclosure relates to a mobile terminal capable of guiding a function currently executable on a screen to a front surface according to a user interaction with a rear input unit, and a rear input unit operation method of the same.

2. Description of the Related Art

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs.

Various new attempts have been made for mobile terminals in the aspect of hardware or software in order to implement the foregoing functions of multimedia devices. For an example, a user interface environment is provided in order for users to easily and conveniently retrieve or select functions.

Furthermore, as a mobile terminal is considered as a personal belonging for expressing his or her own personality, various design forms are required. The design forms include structural modifications and improvements for a user to more easily use the mobile terminal. A manipulation unit may be may be taken into consideration for one of the structural modifications and improvements.

On the other hand, a manipulation unit disposed on a front surface of the mobile terminal may hinder the slim and simple designs of the terminal. Furthermore, there may exist a problem such as reducing a display region due to a manipulation unit disposed at a lateral surface of the mobile terminal, and the like.

Accordingly, in order to solve such problems, a manipulation unit (rear input unit) with a new structure provided on a rear surface of the mobile terminal and an input method thereof may be taken into consideration, but the rear input unit may not be seen when a user executes a predetermined content through a front display unit, and thus it may not be easy to accurately recognize and manipulate the location of a plurality of buttons (keys) provided on the rear input unit.

SUMMARY OF THE INVENTION

An object of the present disclosure is to provide a mobile terminal capable of guiding the use aspect of a rear input unit to a front display unit according to a user interaction with a rear input unit, and a rear input unit operation method of the same.

Another object of the present disclosure is to provide a mobile terminal capable of guiding a function executable by a rear input unit to a front display unit in response to an execution application, and a rear input unit operation method of the same.

Still another object of the present disclosure is to provide a mobile terminal capable of guiding a position corresponding to a rear input unit to a front display unit to easily manipulate the rear input unit, and a rear input unit operation method of the same.

In order to accomplish the foregoing objectives, a mobile terminal according to an embodiment of the present disclosure may include a display unit disposed on a front surface to display content on a screen; a rear input unit disposed on a rear surface to sense a user's interaction; and a controller configured to guide a function currently executable on a screen on the display unit based on the displayed content type and an interaction type applied to the rear input unit.

The rear input unit may be implemented with push button or touch button provided with a fingerprint recognition sensor.

The user interaction may include a press and touch to at least one or more buttons provided on the rear input unit.

A type of the content may include a standby screen, a text, an image, a webpage and a function application screen of the mobile terminal, and a type of the interaction is one of a short or long press, a short touch, a long touch and a scrolling.

The guide section may include an indicator having the same position, shape and size as those of the rear input unit, and be displayed in a transparent or semi-transparent manner when a first input is applied to the rear input unit.

The controller may determine and guide one function based on a type of the content type and a type of the interaction applied to the rear input unit among multi-functions set to the rear input unit.

The controller may display a guide section having the same position, shape and size as those of the rear input unit to guide the function.

The controller may display at least one or more icons indicating functions within the guide section, and the icons may include function information and direction information.

The controller may display the position of a button of the rear input unit currently placed on a finger on the guide section.

The controller may allocate executable functions to the rear input unit for each direction to guide them on the display unit during the sensing of a first input, and perform the guided each function according to the direction of a second input.

The controller may display functions allocated to the guide section for each direction.

The guide section may include an icon indicating each function and an icon indicating a selection direction of the each function.

According to an embodiment, the first input may be an input to a center button of the rear input unit, and the second input may be an input to a center button or up/down button of the rear input unit.

According to another embodiment, the first and the second input may be inputs to a center button of the rear input unit, wherein the first button indicates a press or touch input, and the second input indicates a scroll input.

The controller may perform user authentication through fingerprint recognition during the sensing of a first input, and recognize the direction of a second input through fingerprint recognition to perform a function in the relevant direction during the sensing of the second input.

In order to accomplish the foregoing objectives, a rear input unit operation method of a mobile terminal according to an embodiment of the present disclosure may include displaying content on a front display unit; sensing a user interaction with a rear input unit; and guiding a function currently executable on a screen for the rear input unit on the front display unit based on a type of the sensed user interaction.

The rear input unit may be implemented with push button or touch button provided with a fingerprint recognition sensor.

The user interaction may include a press and touch to at least one or more buttons provided on the rear input unit.

A type of the content may include a standby screen, a text, an image, a webpage and a function application screen of the mobile terminal, and a type of the interaction is one of a short or long press, a short touch, a long touch and a scrolling.

The function currently executable on the screen may be determined according to a type of the content and a type of the interaction applied to the rear input unit among multi-functions set to the rear input unit during the sensing of a first input to the rear input unit.

The function currently executable on the screen may be displayed through the guide section having the same position, shape and size as those of the rear input unit.

The guide section may include at least one or more icons indicating functions, and the icons may include function information and direction information.

Said guiding step may include allocating functions currently executable on a screen for the rear input unit for each direction during the sensing of a first input to the rear input unit to guide them to the front display unit, and may further include executing a predetermined function according to the direction of a second input applied to the rear input unit.

The allocated functions for each direction may be displayed through the guide section.

The guide section may include an icon indicating a function and an icon indicating a selection direction of the function.

According to an embodiment, the first input may be an input to a center button of the rear input unit, and the second input is an input to a center button or up/down button of the rear input unit.

According to another embodiment, both the first and the second input may be inputs to a center button of the rear input unit, wherein the first input is a touch input, and the second input is a scroll input.

The present disclosure may set multi-functions to the rear input unit, and determine a currently executable function by a user's interaction applied to the rear input unit and a type of content displayed on the screen, and then guide it to a front display unit, thereby having an effect of allowing the user to easily check which button is currently inputted and which function is selected to be executable without directly viewing a rear manipulation.

Furthermore, the present disclosure may guide a rear input unit at the same position of the front display unit corresponding to the rear input unit to display the position of a finger, thereby having an advantage of allowing the user to easily manipulate the manipulation of the rear input unit without directly viewing the rear input unit.

In addition, the present disclosure may allocate a plurality of functions executable by the rear input unit on a current screen for each direction to guide them on the front display unit, and recognize the direction of a subsequent input to the rear input unit to execute a function allocated to the relevant direction to allow allowing the user to perform any function with the rear input unit, and check which button should be manipulated to select his or her desired function, thereby having an effect capable of easily and conveniently executing his or her desired function without directly viewing the rear input unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal associated with the present disclosure will be described in more detail with reference to the accompanying drawings. A suffix "module" or "unit" used for constituent elements disclosed in the following description is merely intended for easy description of the specification, and the suffix itself does not give any special meaning or function.

A mobile terminal disclosed herein may include mobile terminals such as a portable phone, a smart phone, a laptop computer, a digital broadcast terminal, a personal digital assistant (PDA), a portable multimedia player (PMP), a navigation, and the like.

Figure 1:
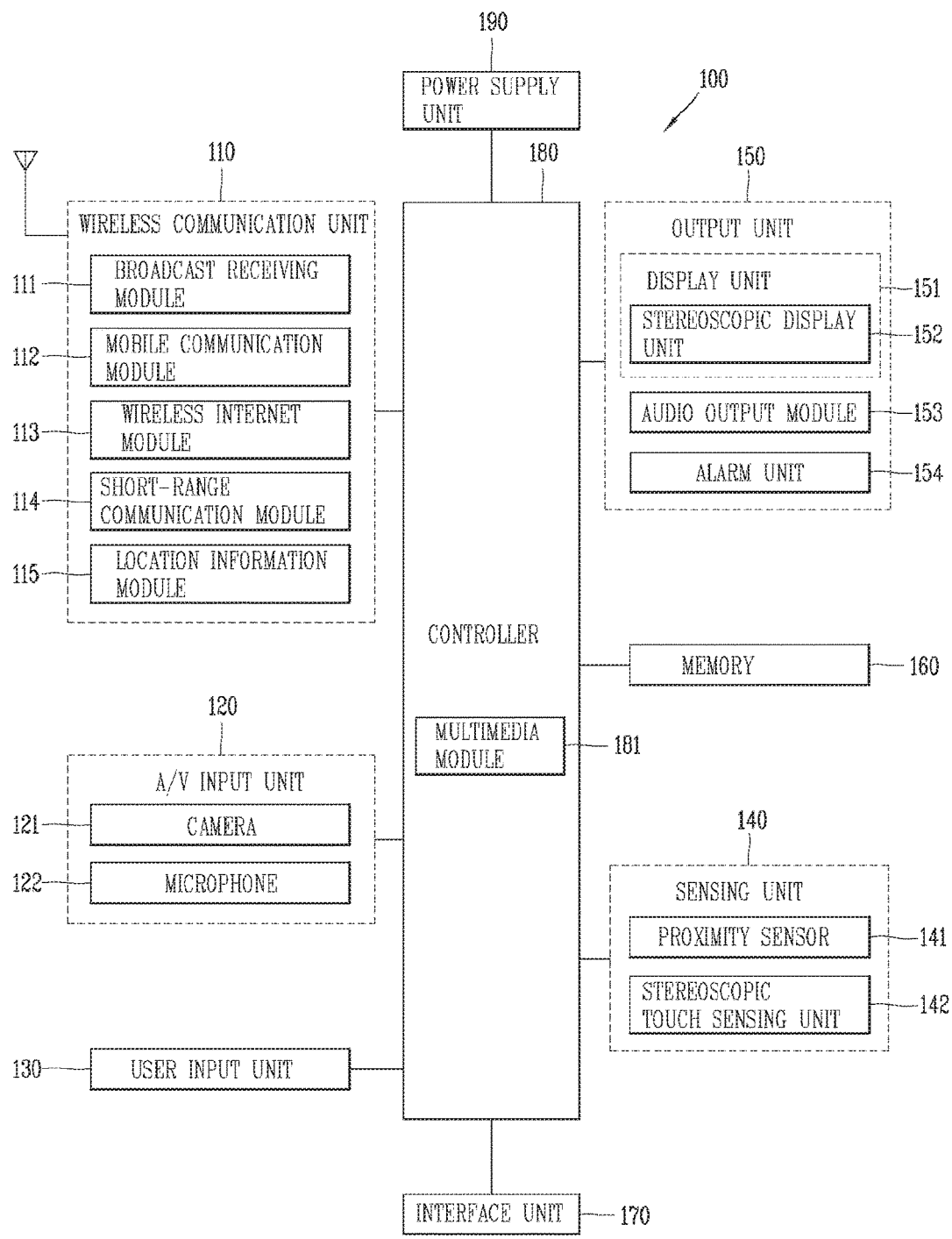
FIG. 1 is a block diagram illustrating a mobile terminal associated with an embodiment of the present disclosure.

FIG. 1 is a block diagram illustrating a mobile terminal associated with an embodiment of the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more modules allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is combined with the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

Furthermore, the mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a Global Positioning System (GPS) module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170. On the other hand, the sensing unit 140 may include a proximity sensor 141.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is a video call mode or capture mode, the display module 151 displays a captured or/and received image or a UI, a GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the portable terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 142 may be arranged at an inner region of the portable terminal 100 covered by the touch screen, or near the touch screen. The proximity sensor 142 indicates a sensor to sense presence or absence of an object approaching to a surface to be sensed, or an object disposed near a surface to be sensed, by using an electromagnetic field or infrared rays without a mechanical contact. The proximity sensor 142 has a longer lifespan and a more enhanced utility than a contact sensor.

The proximity sensor 142 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 142 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the portable terminal 100, e.g., sound alarming a call received or a message received, and so on. The audio output module 152 may include a receiver, a speaker, a buzzer, and so on.

The alarm 153 outputs signals notifying occurrence of events from the portable terminal 100. The events occurring from the portable terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the portable terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the portable terminal 100, or a data transmission from the portable terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the portable terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the portable terminal 100 via a port.

Also, the interface unit may serve as a path for power to be supplied from an external cradle to the portable terminal 100 when the portable terminal 100 is connected to the external cradle or as a path for transferring various command signals inputted from the cradle by a user to the portable terminal 100. Such various command signals or power inputted from the cradle may operate as signals for recognizing that the portable terminal 100 has accurately been mounted to the cradle.

The controller 180 typically controls the overall operations of the portable terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Considering the user input unit 130 again, according to the present disclosure, the user input unit 130 may be disposed on a rear surface of the terminal, and a front display unit may be formed with a larger screen. Hereinafter, a specific structure in which the user input unit 130 is disposed on a rear surface thereof, and an operation implemented by the same will be described in more detail.

Figure 2A:
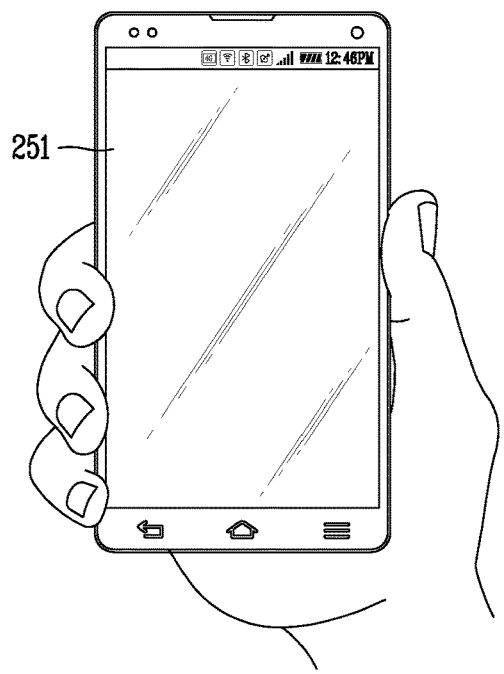
FIGS. 2A through 2C are conceptual views illustrating an operation implemented by the present disclosure.
Figure 2B:
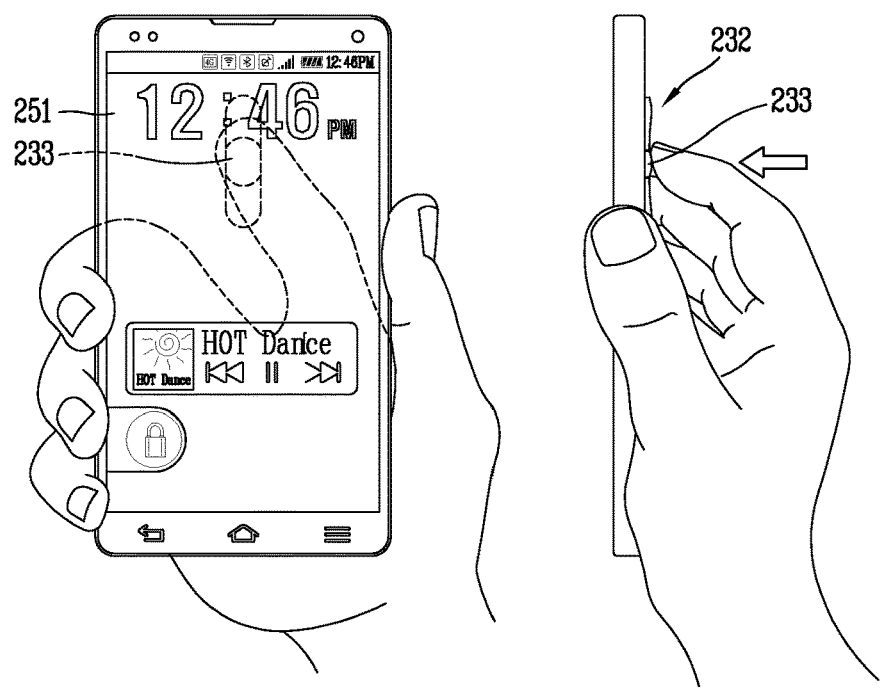
Figure 2C:
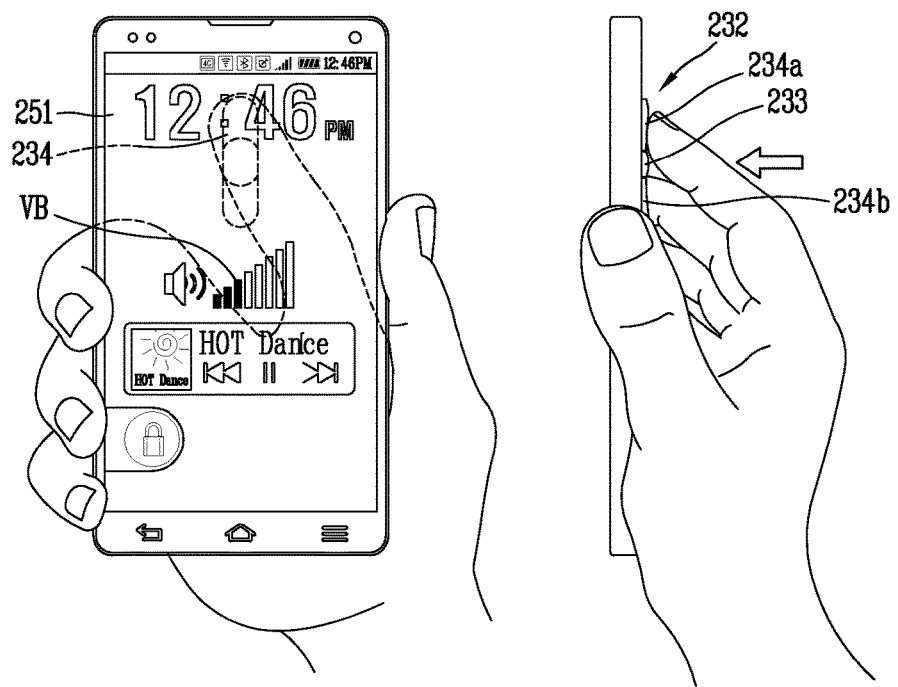

FIGS. 2A through 2C are conceptual views illustrating an operation implemented by the present disclosure.

Referring to FIG. 2A, the mobile terminal may include a display unit 251 disposed on one surface of the body, for example, a front surface thereof. A graphic user interface (GUI) of a currently executed application may be displayed on the display unit 251, and a touch sensor for sensing a touch input may be provided on the display unit 251 to allow a touch input to the GUI. The display unit 251 may display visual information implemented in the form of an image, a text, an icon and the like, such as the GUI, but as illustrated in the drawing, may be switched to an inactive state by the passage of a predetermined time or an input of a specific control command. The state of FIG. 2A illustrates such a state, for instance, a state in which the display unit 251 is deactivated during the execution of a music playback application.

Referring to FIG. 2B, a rear input unit 232 is disposed on the other surface of the body, for example, a rear surface thereof. The rear input unit 232 receives a control command for the display unit 251. More specifically, when a push input is applied to any button 233 of the rear input unit 232, the display unit 251 is switched to an active state. In other words, the rear input unit 232 may be a power key for turning on or off the display unit 251. Accordingly, the on/off of the terminal itself may be carried out by the button 233. According to the drawing, a GUI of a music playback application is displayed while activating the display unit 251.

Referring to FIG. 2C, when a push input is applied to another button 234a (up button) of the rear input unit 232 in the state of FIG. 2B, a volume is adjusted by the manipulation of the another button 234a while displaying a volume bar (VB). However, the present disclosure may not be necessarily limited to the foregoing process, and a push input to the another button 234 of the rear input unit 232 may be an input to volume adjustment in the state of FIG. 2A.

According to the foregoing illustration, a user may input a control command to a rear surface of the terminal in the form of a push while viewing the display unit 251. As a result, the rear input unit on a rear surface of the terminal may be configured to receive a push input, and according to circumstances, may perform the role of a power key and a volume key of the terminal.

Figure 3A:
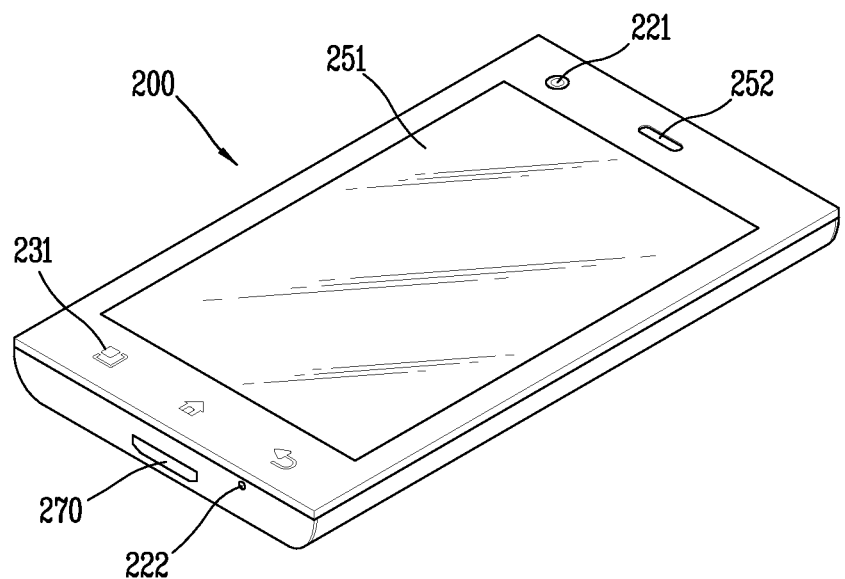
FIG. 3A is a front perspective view illustrating an example of a mobile terminal associated with the present disclosure.
Figure 3B:
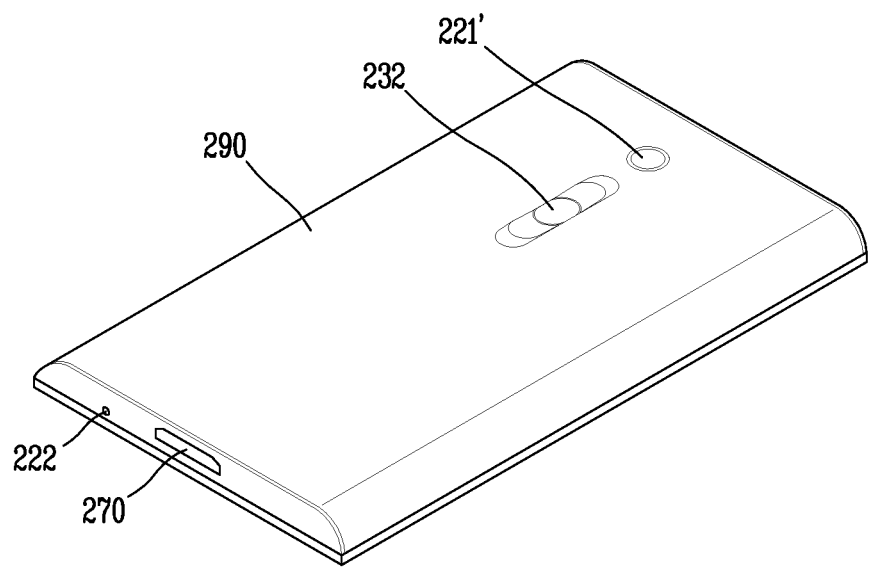
FIG. 3B is a rear perspective view of the mobile terminal illustrated in FIG. 3A.

Hereinafter, the hardware configuration of a terminal for performing the operation of FIGS. 2A through 2C will be described in more detail. FIG. 3A is a front perspective view illustrating an example of a mobile terminal associated with the present disclosure, and FIG. 3B is a rear perspective view of the mobile terminal illustrated in FIG. 3A.

A mobile terminal 200 disclosed herein may include a portable phone body in a bar shape. However, the present disclosure may not be necessarily limited to this, and may be also applicable to various structures such as a slide type, a folder type, a swing type, a swivel type, or the like, in which two and more bodies are coupled to each other in a relatively movable manner.

The body includes a case (casing, housing, cover, etc.) forming an appearance of the terminal. In the present embodiment, the case may be divided into a front case and a rear case. Various electronic components may be incorporated into a space formed between the front case and the rear case.

A display unit 251, an audio output unit 252, a camera module 221 and the like may be formed on the terminal body (mainly, on the front case). An interface unit 270 and the like may be disposed on a lateral surface of the front case and rear case.

The display unit 251 occupies most of the primary surface of the front case. In other words, the display unit is disposed on a front surface of the terminal, and formed to display visual information. The audio output unit 252 and cameral module 221 are disposed in a region adjacent to one of the both end portions of the display unit 251, and a front input unit 231 and a microphone 222 are disposed in a region adjacent to the other end portion thereof.

The front input unit 231 as an example of the user input unit 130 (refer to FIG. 1) may include a plurality of manipulation units. The manipulation units may be commonly referred to as a manipulating portion, and any method can be employed if it is a tactile manner allowing the user to perform manipulation with a tactile feeling. According to the present embodiment, the front input unit 231 is configured as a touch key. However, the present disclosure may not be necessarily limited to this, and a push key may be added to the front input unit 231.

Furthermore, the display unit 251 may form a touch screen along with the touch sensor, and in this case, the touch screen may be a user input unit. Through this, it may allow a configuration without any front input unit on a front surface of the terminal. In this case, the mobile terminal may be configured to allow an input manipulation to the terminal body only through the display unit 251 and a rear input unit 232 which will be described later.

Referring to FIG. 3B, a camera module 221' may be additionally added to a rear surface of the terminal body, namely, rear case. The camera module 221' may have a capture direction substantially opposite to that of the cameral module 221 (refer to FIG. 3A), and may be a camera having a different number of pixels from that of the cameral module 221.

For example, the camera module 221 may have a low number of pixels not to have a burden in capturing a user's face and transmitting it to the counterpart in case of a video call or the like, and the camera module 221' may preferably have a high number of pixels since there are a lot of cases of capturing a typical subject but not immediately transmitting it. The camera modules 221, 221' may be provided on the terminal body in a rotatable or pop-up manner.

A flash and a mirror may be additionally disposed adjacent to the camera module 221'. The flash may illuminate light toward a subject in case of capturing the subject with the camera module 221'. The mirror may allow the user to look at his or her own face, or the like, in a reflected way when capturing himself or herself (in a self-portrait mode) by using the camera 221'.

An audio output unit (not shown) may be additionally disposed on a rear surface of the terminal body. The audio output unit 252' along with the audio output unit 252 (refer to FIG. 3a) can implement a stereo function, and may be also used to implement a speaker phone mode during a phone call.

A power supply unit 290 for supplying power to the portable terminal 200 may be mounted on a rear surface of the terminal body. The power supply unit 290 may be configured so as to be incorporated in the terminal body, or directly detachable from an outside of the terminal body.

According to the drawing, a rear input unit 232 may be disposed on a rear surface of the terminal body. The rear input unit 232 may be located at a lower portion of the camera module 221', for example.

The rear input unit 232 may be manipulated to receive a command for controlling the operation of the mobile terminal 200, and the received content may be set in various ways. For example, it may be possible to receive a command such as power on/off, start, end, scroll or the like, or a command such as volume adjustment output from the audio output unit 252, switching to a touch recognition mode of the display unit 251, or the like.

The rear input unit 232 of the present disclosure may be implemented in the form of allowing a push input or touch input. More specifically, the rear input unit 232 may be configured with a mechanical or physical button which is a relative concept with respect to the touch screen, or configured with a touch button.

As described above, the display unit 251 may be disposed on a front surface of the terminal body and the rear input unit 232 may be disposed on a rear surface thereof. An application being executed displayed on the display unit 251, and the rear input unit 232 may be provided with at least one or more buttons 233, 234a, 234b capable of entering a control command to the display unit 251. The at least one or more buttons 233, 234a, 234b may be implemented with a push button or touch button, for example, a home button, a volume up button, and a volume down button, respectively.

Furthermore, the rear input unit 232 may be provided with a single button, and in this case, a function defined by an input to any one of the plurality of buttons may be also applicable in a similar manner to the single button.

The user may enter a control command in a touch manner through the rear input unit 232 disposed on a rear surface of the terminal while viewing the display unit 251. Consequently, the rear input unit may be configured to receive a push input or touch input, and its function and menu may be determined according to a function (e.g., a text, a call, a standby screen, etc.) being executed on the display unit 251, and the function and menu may be changed according to its function setting.

However, since the rear input unit 232 is not seen in a state that the user views the display unit 251, it is not easy for a user who is not familiar with the manipulation to accurately recognize and manipulate the position of a plurality of buttons (or a plurality of keys) of the rear input unit 232. For example, when the user presses or touches a specific button of the rear input unit 232, there is no feedback thereof, and therefore, it is unable to check whether or not the relevant button is properly recognized, and when multi-functions are mapped to the rear input unit 232, it is unable to know which function is selected and executed by the recognized button.

When a plurality of functions are allocated to the rear input unit 232, the function or role of the rear input unit 232 is determined according to which application is used by the user on a current screen. For example, the rear input unit 232 is used as a volume adjustment function when the user listens to music, and used as a brightness or volume adjustment function when the user views a video. However, it is not easy for the user to memorize and execute various functions of the rear input unit 232 according to an application currently being displayed.

Accordingly, the present disclosure provides a scheme of automatically guiding at least one function (or menu) that can be carried out on a current screen based on a user's interaction with the rear input unit. At least one or more of the functions are allocated and guided for each direction.

In other words, the present disclosure may guide a function (or menu) that can be carried out by the rear input unit 232 on each module (application) to the display unit 251, thereby allowing the user to more easily manipulate the rear input unit 232. The method may guide the position of the rear input unit 232 on the front surface for the user without viewing the rear surface, thereby having an advantage of directly controlling the menu.

The term module denotes a hardware element, a software element or a combination of hardware and software elements, but according to the present disclosure, it denotes a software element stored in the memory, namely, a content or application displayed on a screen.

The rear input unit 232 may be implemented by a physical button (or key) or touch button, or implemented by a physical button (or key) or touch button provided with a fingerprint recognition sensor.

Multi-functions are set to the rear input unit 232, and a function currently executable on a screen is determined according to a user interaction and a type of an application (or function) being executed on the display unit 251.

The interaction may include a user's button touch (short touch, long touch), a button press, a button scroll, and the like.

A least one or more functions executable on the screen or the determined function may be guided through an indicator.

The indicator may be displayed to correspond to a shape of the rear input unit 232, and may include at least one or more icons indicating functions currently executable on a screen.

The indicator may be displayed at the same position of the front display unit 251 corresponding to the rear input unit 232, and the display position may be changed through a menu setting or discretionally changed by a touch manipulation.

The indicator is displayed when an input is applied to the rear input unit 232 by a finger, and disappears when the input is released. The input may include a short press, a long press, and a contact (a hold, a hold & drag).

Figure 4:
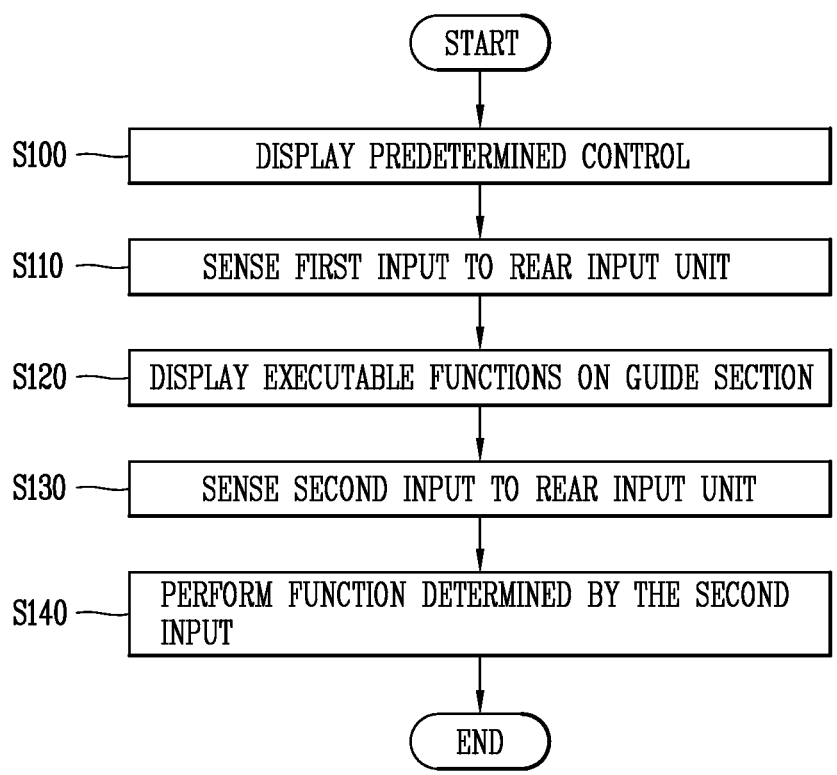
FIG. 4 is a flow chart illustrating a first embodiment of a rear input unit operation method of a mobile terminal according to an embodiment of the present disclosure.

FIG. 4 is a flow chart illustrating a first embodiment of a rear input unit operation method of a mobile terminal according to an embodiment of the present disclosure.

As illustrated in FIG. 4, a user may display a predetermined content on the display unit 151 or 251 while holding (gripping) a mobile terminal with his or her one hand (S100). The predetermined content may be a content or application selected by the user's input event or a content or application activated by an external event (incoming call, incoming mail). The content may include an image, a video (including moving images), a text, a webpage, and the like.

Then, when an interaction (first input) with the rear input unit is sensed from a user (S110), the controller 180 may display at least one function currently executable on a screen on the front display unit through the guide section based on a currently displayed content type and a type of the first input applied to the rear input unit (S120). In this case, the controller 180 may determine a type (kind) of the currently displayed content and a type of the user interaction (second input) to determine that the user currently selects which one of the multi-functions set to the rear input unit (S120). For an example, when a photo is currently displayed on the display unit 251, and the second input is a scroll, the controller 180 recognizes (determines) that a photo flicking has been selected, and displays a guide section (or indicator) on the display unit 251 to indicate that a photo flicking is currently available (S130). The guide section (or indicator) is displayed for a period during which the recognized (determined) function has been started and ended, namely, for a period during which a flicking has been started and ended. For another embodiment, the controller 180 may merely guide a function currently executable on the screen using the rear input unit.

When a flicking to the rear input unit is ended, the controller 180 performs the selected photo flicking to switch and display a currently displayed photo to another photo (S140).

Figure 5A:
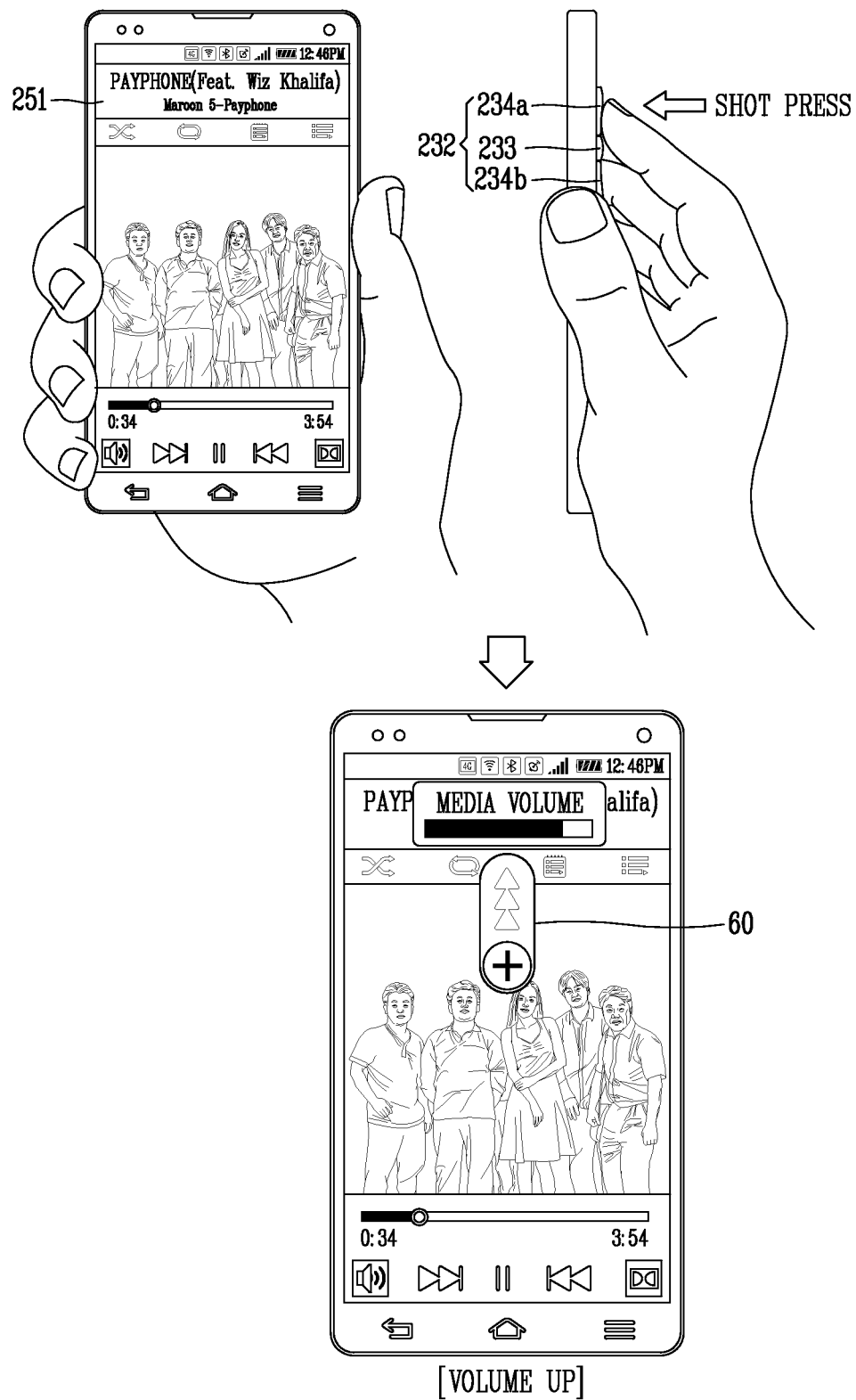
FIGS. 5A through 5C are views illustrating an embodiment of visually guiding a function that can be carried out by the rear input unit during the playback of an image.
Figure 5B:
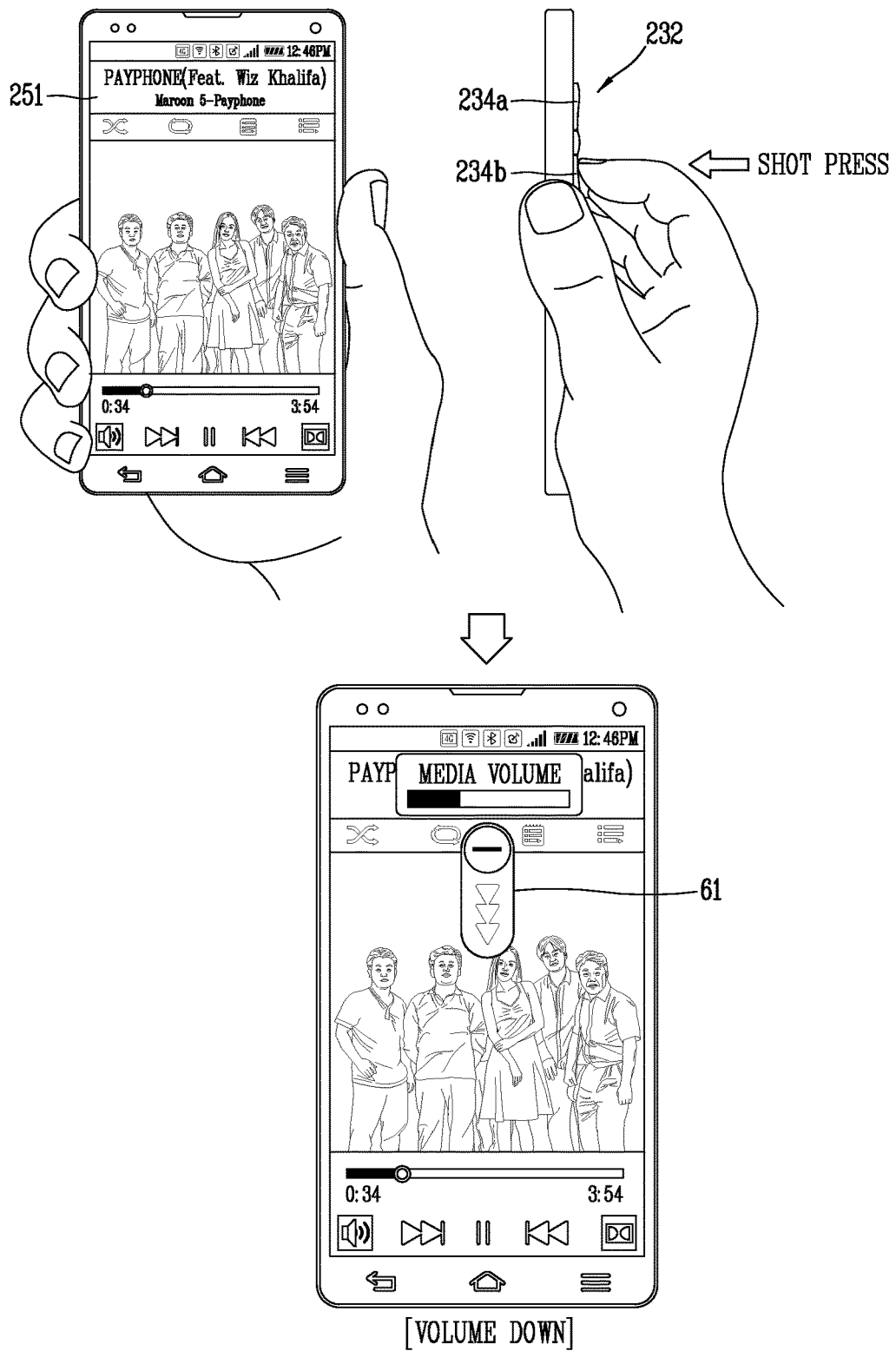
Figure 5C:
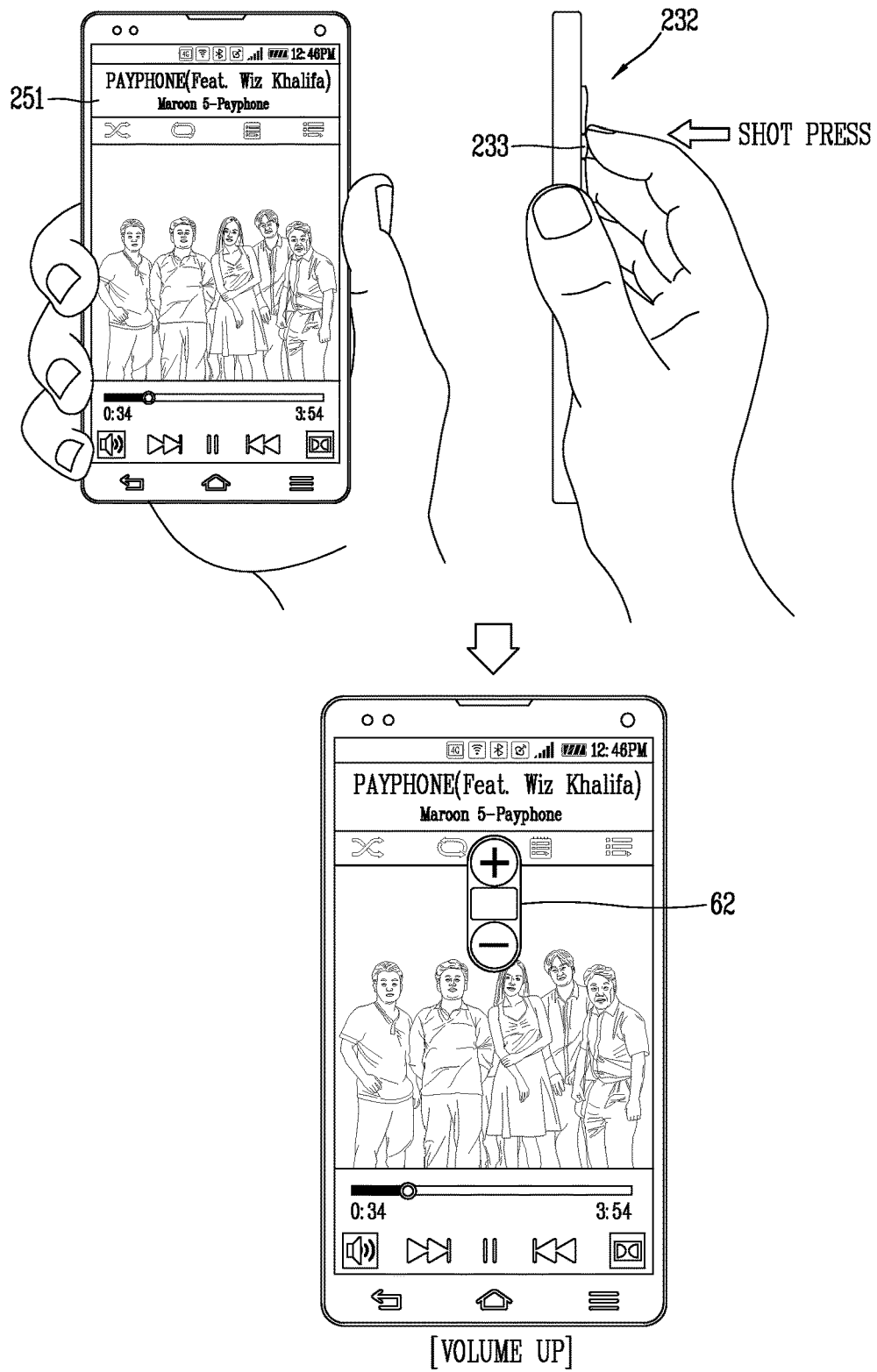

FIGS. 5A through 5C are views illustrating an embodiment of visually guiding a function that can be carried out by the rear input unit during the playback of an image. Hereinafter, the guide section will be described as an indicator for an example.

As described above, an up button 234a and a down button 234b of the rear input unit 232 may perform various functions according to a type of the content being executed on the display unit 251. FIGS. 5A and 5B illustrate an example in which the rear input unit is implemented as a physical key, and FIG. 5C illustrates an example in which the rear input unit is implemented as a touch button.

Referring to the present drawing, various contents (video, image, text) executed by the user may be displayed on the display unit 251 of the mobile terminal. When the user presses his or her finger (first input) to the rear input unit 232 on a rear surface thereof in a state that the user holds the terminal, an indicator 60 (or guide section) for guiding a function that can be implemented by the rear input unit 232 on a currently displayed application is displayed on the display unit 251.

A function guided on the indicator 60 is determined according to a user interaction type with the rear input unit 232 and a type of the currently executed content.

For example, as illustrated in FIG. 5A, when the up button 234a of the rear input unit 232 is pressed (short press) in a state that music is currently being played back on the display unit 251, an indicator 60 capable of executing a volume up function is displayed on the indicator 60 of the display unit 251. Accordingly, the user may press the up button 234a (second input) to increase the volume of the relevant music. At this time, an icon indicating a "volume up" function is displayed on the indicator 60.

On the contrary, as illustrated in FIG. 5B, when the down button 234b of the rear input unit 232 is pressed (short press, first input) in a state that music is being played back on the display unit 251, an indicator 61 capable of executing a volume down function is displayed on the indicator 60 of the display unit 251. Accordingly, the user may press the down button 234b (second input) to decrease the volume of the relevant music. Similarly, an available function is displayed as an icon on the indicator 60.

For an another embodiment, as illustrated in FIG. 5C, when one (the center button 233) of buttons on the rear input unit 232 is touched (first input) in a state that music is being played back on the display unit 251, an indicator 62 for guiding volume up and down functions is displayed on the indicator 62 of the display unit 251. Accordingly, the user may touch the up button 234a or down button 234b (second input) to adjust the volume of the relevant music.

Figure 6A:
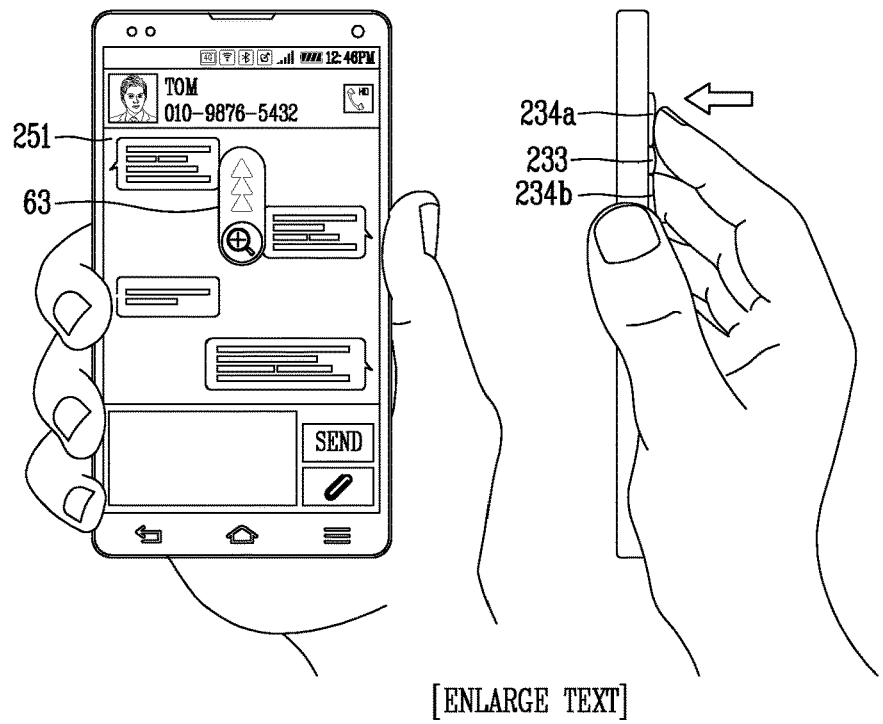
FIGS. 6A through 6C are views illustrating an embodiment of visually guiding a function that can be carried out by the rear input unit when a message is displayed.
Figure 6B:
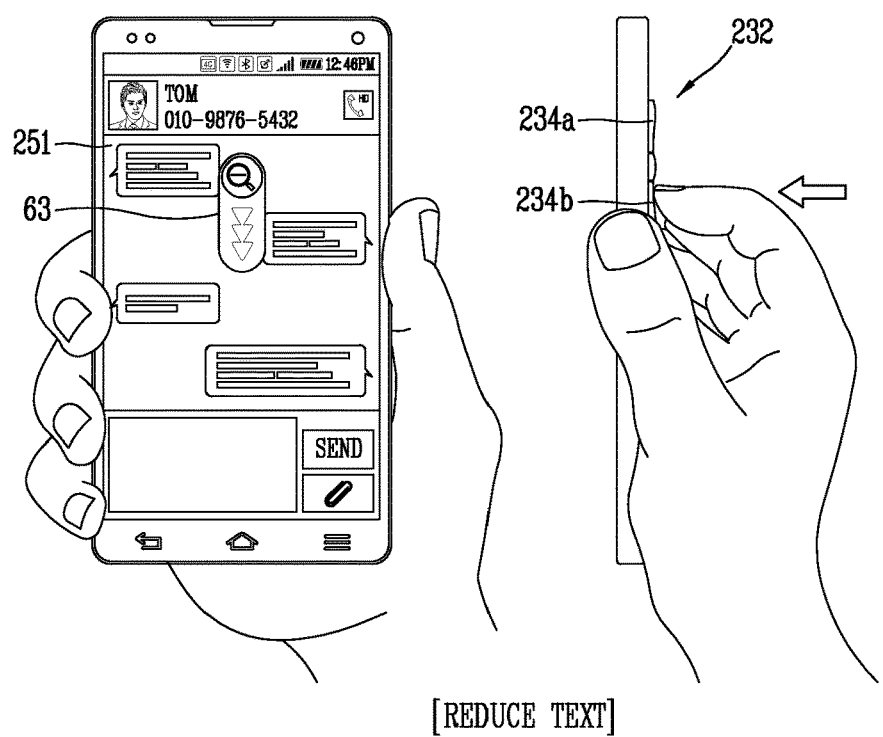
Figure 6C:
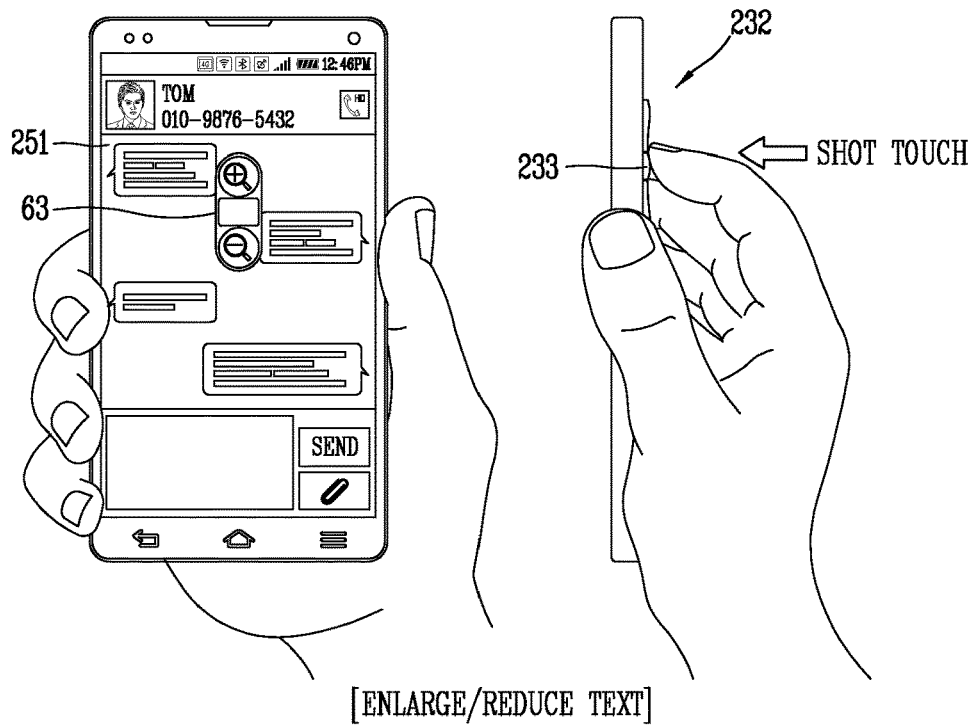

FIGS. 6A through 6C are views illustrating an embodiment of visually guiding a function that can be carried out by the rear input unit when a message is displayed. FIGS. 6A and 6B illustrate an example in which the rear input unit is implemented as a physical key, and FIG. 6C illustrates an example in which the rear input unit is implemented as a touch button.

Referring to the present drawing, a user's message or webpage sent to or received from another user may be displayed on the display unit 251. When the user slightly presses the up button 234a of the rear input unit 232 with his or her finger (first input) while viewing the content of the message, as illustrated in FIG. 6A, an indicator 63 indicating that a zoom-in function of text can be carried out with the up button 234a of the rear input unit 232 is displayed on the front display unit 251. The user may press the up button 234a to enlarge the message to his or her desired size (second input).

When the user presses the down button 234b of the rear input unit 232 again with his or her finger in a state that a size of the message has been enlarged, as illustrated in FIG. 6B, an indicator 64 indicating that a text zoom-out function can be carried out with the down button 234b of the rear input unit 232 is displayed on the display unit 251.

For another embodiment, as illustrated in FIG. 6C, when one of buttons on the rear input unit 232 is touched in a state that a message is currently displayed on the display unit 251, an indicator 65 for guiding an enlargement and reduction function is displayed on the display unit 251. Accordingly, the user may touch the up button 234a or down button 234b to adjust the volume of the relevant music.

According to the present disclosure, for the sake of convenience of explanation, contents displayed on the display unit 251 have been limited to music and messages, and a function that can be carried out by the rear input unit 232 has been described with an example of specific buttons 234a, 234b, but the present disclosure may not be necessarily limited to this, and may be also applicable in a similar manner to a central home button 233 and various other contents and applications.

Figure 7:
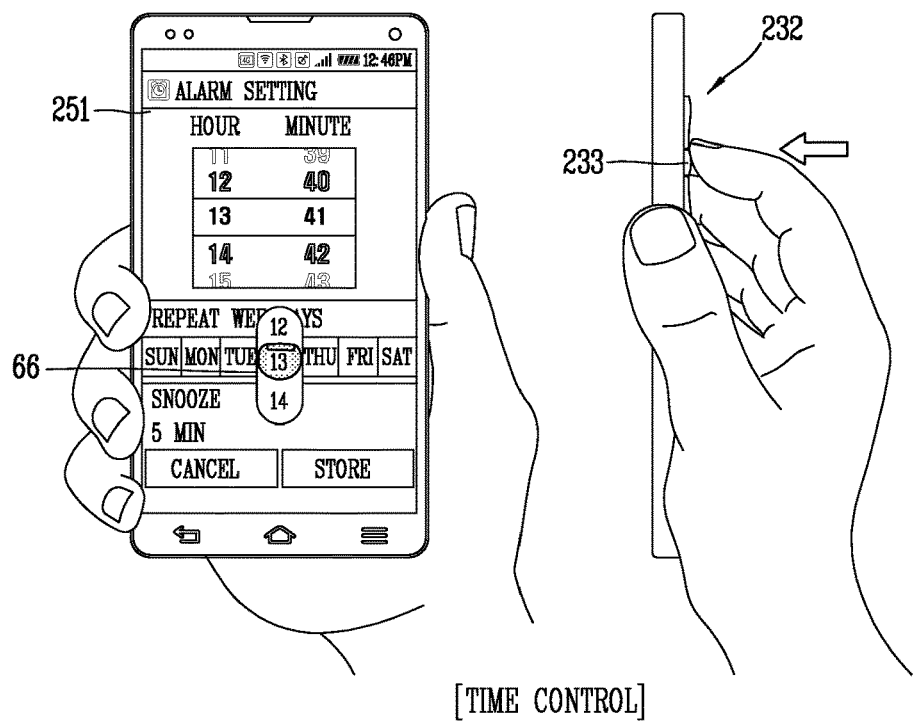
FIG. 7 is a view illustrating an embodiment of visually guiding a function that can be carried out by the rear input unit when a time-related application is displayed.

FIG. 7 is a view illustrating an embodiment of visually guiding a function that can be carried out by the rear input unit when a time-related application is displayed.

A user may display an application associated with a time (year, month, day, hour, minute) and a day of week such as a calendar or alarm setting. When the user presses the button 233 of the rear input unit 232 in a state that the foregoing application is displayed, an indicator 66 indicating that a time control function can be currently carried out by the rear input unit 232 is displayed on the display unit 251. Accordingly, the user may set his or her desired time using the up button 234a and down button 234b.

As described above, a push input or touch input applied to the rear input unit 232 may be a control command to the display unit 251 as well as a function to a content displayed on the display unit 251. More specifically, when a push input is applied to the button 233 of the rear input unit 232, the activation status of the display unit 251 may be switched. In other words, for another embodiment, according to the present disclosure, the rear input unit 232 may be a power key for turning on or off the display unit 251.

Figure 8A:
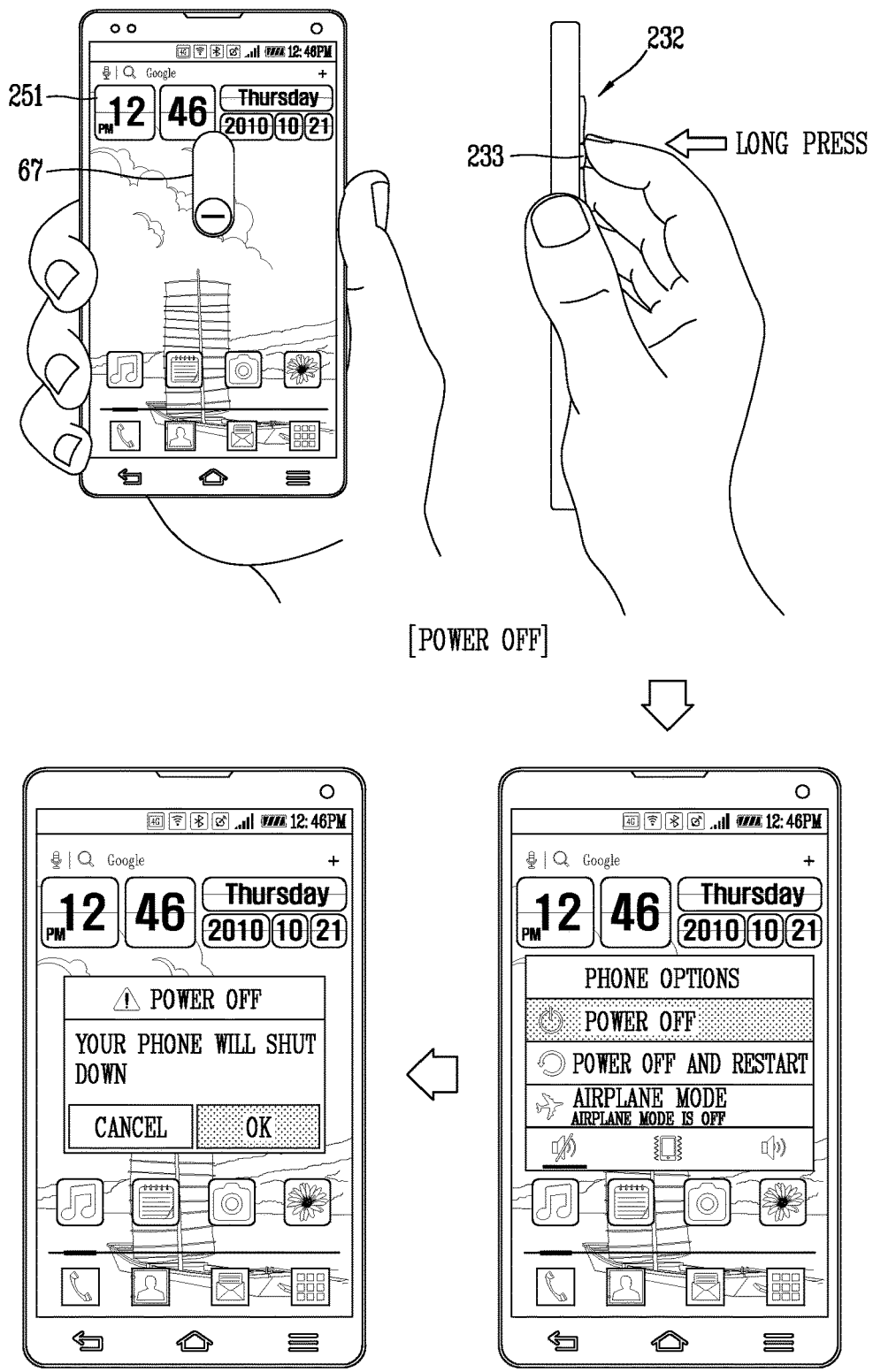
FIGS. 8A and 8B are views illustrating an embodiment of turning on or off the display unit using the rear input unit.
Figure 8B:
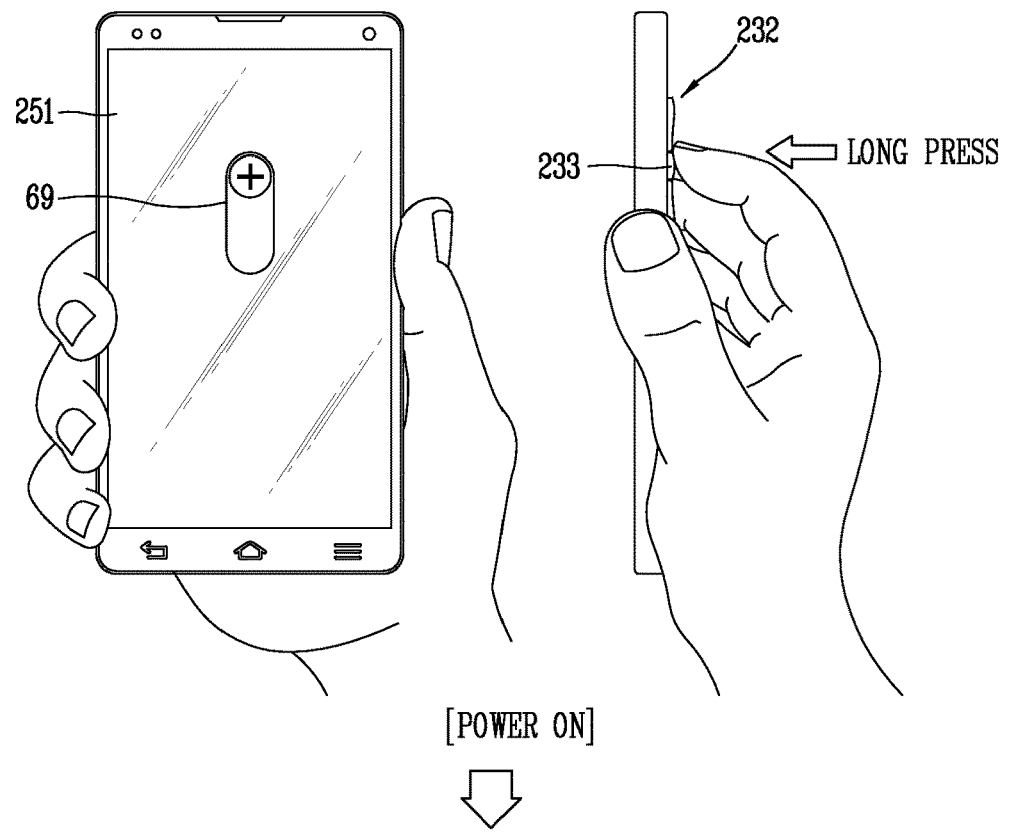
Figure 8B:
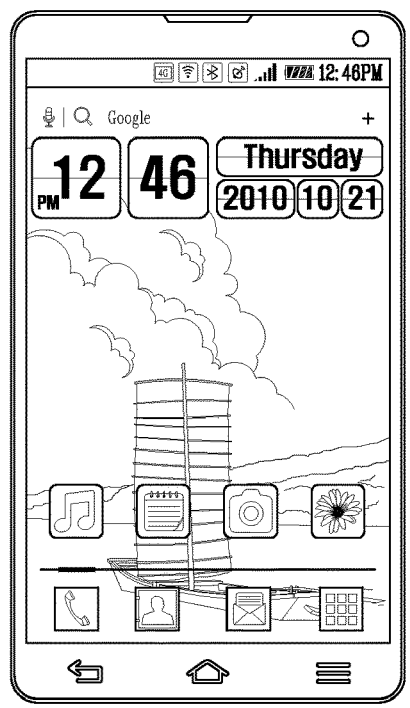

FIGS. 8A and 8B are views illustrating an embodiment of turning on or off the display unit using the rear input unit.

As illustrated in FIG. 8A, when a user presses the button 233 of the rear input unit 232 with his or her finger for a long period of time in a state that he or she holds the terminal with his or her one hand (long press), an indicator 67 indicating a power off function is displayed on the front display unit 251, and then a power off menu is displayed. When the user selects a power off item with his or her another hand and then selects OK, the display unit 251 is powered off.

Furthermore, as illustrated in FIG. 8B, when the user presses the button 233 of the rear input unit 232 for a long period of time in a state that the display unit 251 is powered off, the display unit 251 is powered off while an indicator 69 indicating a power-on function is displayed thereon.

In the above, a case where the rear input unit is mostly a push type has been described, but the rear input unit may be modified in various forms. In other words, the rear input unit may be at least one of a touch pad module, a track ball module, an optical sensor module, a wheel key module and a fingerprint scanner module, and perform the foregoing control operations using them.

On the other hand, the status of the mobile terminal may be divided into a "locked state" and a "released state"

according to whether or not a user's control command input is allowed. Accordingly, the present disclosure provides a scheme of performing a switching operation between the locked state and the released state. Here, the locked state is a state in which an input of a user's control command to applications included in the terminal is restricted. It is to mostly prevent the functions and applications of the mobile terminal from being activated or deactivated due to a user's unintentional control command input to a touch input enabled mobile terminal.

Hereinafter, the embodiments indicating an executable function with a scroll up or scroll down operation of the rear input unit will be described. The scroll up or scroll down indicates a hold & drag operation to a specific key of the rear input unit.

Figure 9A:
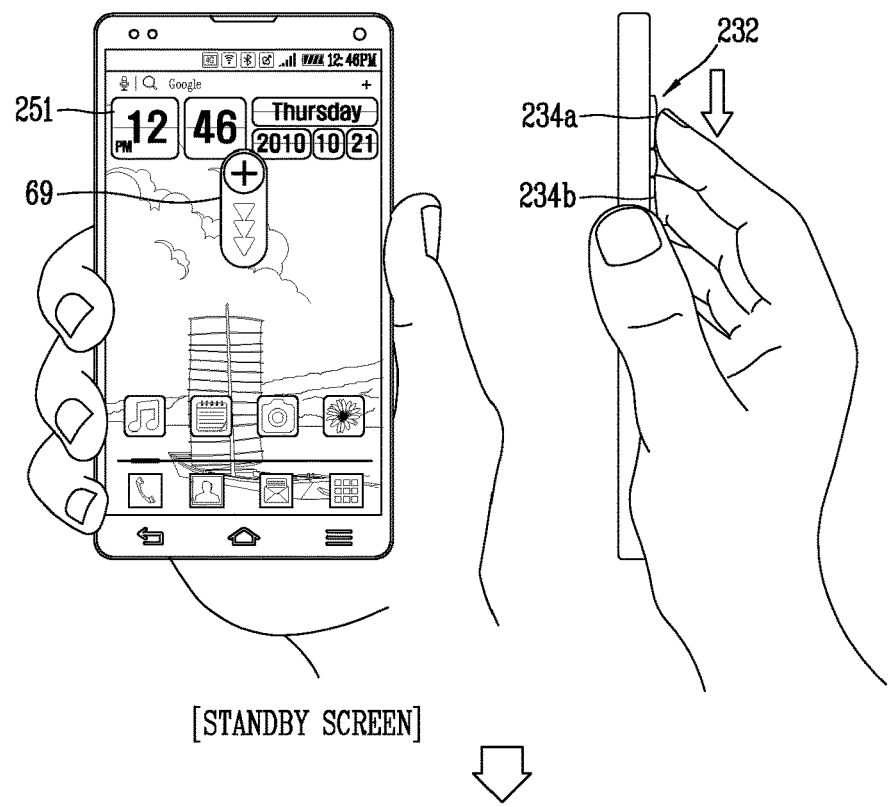
FIGS. 9A and 9B are views illustrating an embodiment of controlling the lock status of the screen using the rear input unit.
Figure 9A:
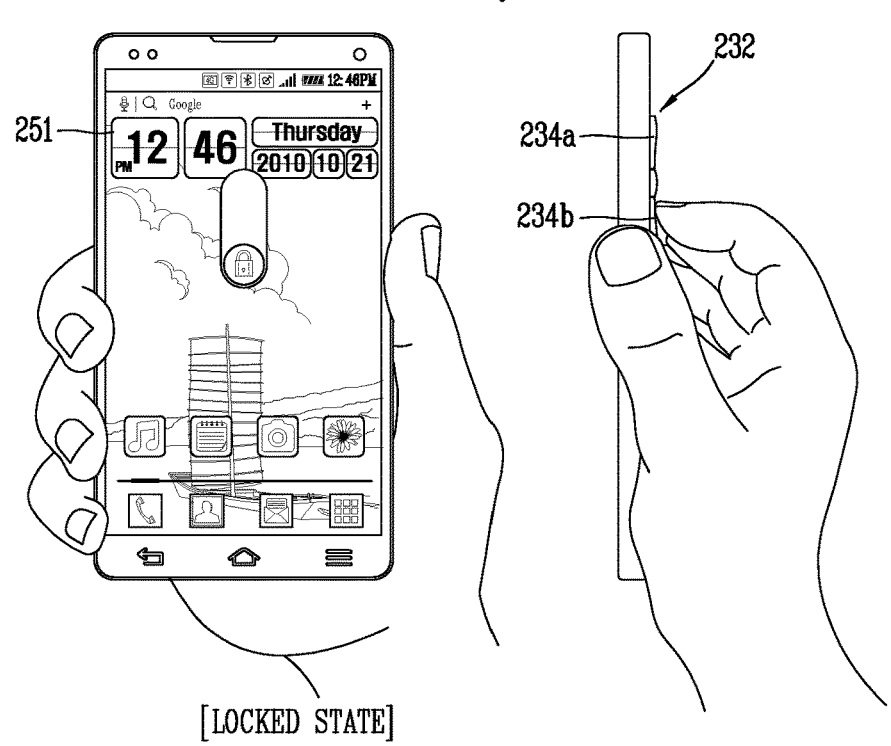
Figure 9B:
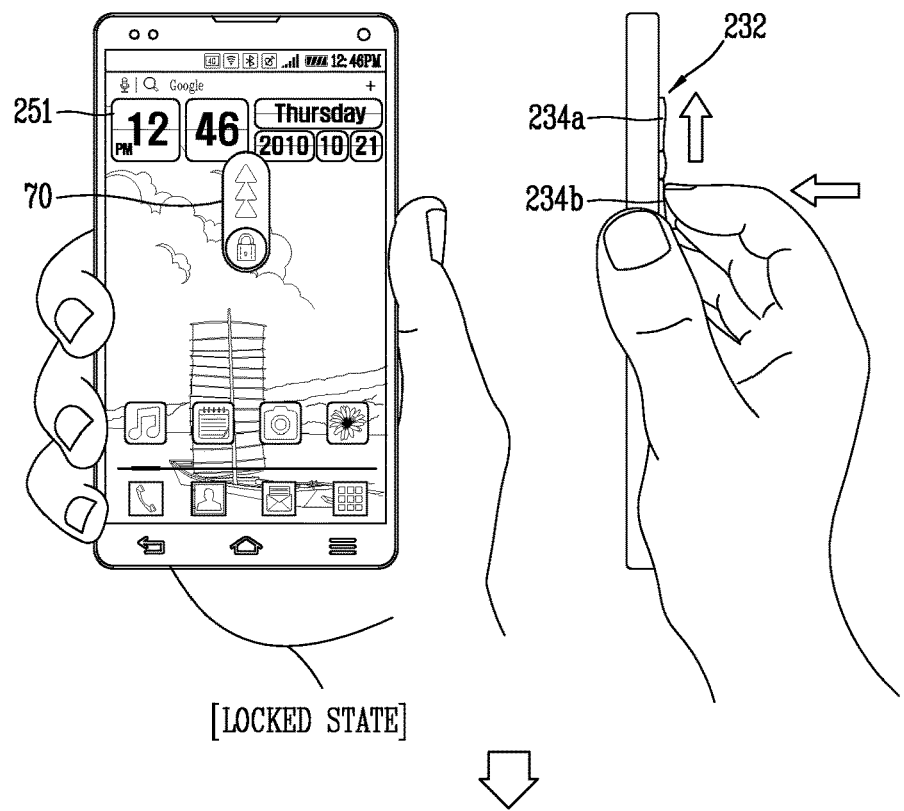
Figure 9B:
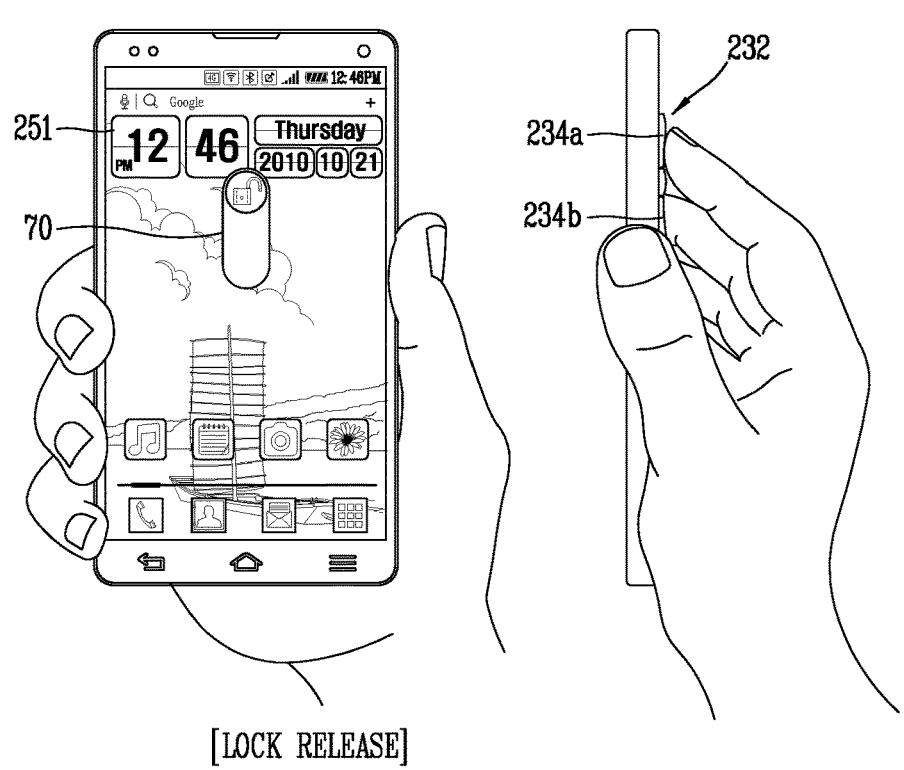

FIGS. 9A and 9B are views illustrating an embodiment of controlling the lock status of the screen using the rear input unit.

As illustrated in FIG. 9A, when a user puts (holds) his or her finger on the up button of the rear input unit 232 in a state that a standby screen is displayed on the display unit, the controller senses a finger contact to display an indicator 69 indicating a lock function. In this state, when the user drags (scrolls) down his or her finger again, a lock icon is displayed on the indicator 69 while at the same time starting a drag operation, and the standby screen is switched to a lock screen when the drag operation is completed.

Furthermore, as illustrated in FIG. 9B, when the user puts (holds) his or her finger on the down button of the rear input unit 232 in a state that a lock screen is displayed on the display unit, an indicator 70 indicating a locked state and a release direction. In this state, when the user drags (scrolls) up his or her finger again, a lock released icon is displayed on the indicator 70 while at the same time starting a drag operation, and the lock screen is switched to a standby screen when the drag operation is completed.

Figure 10:
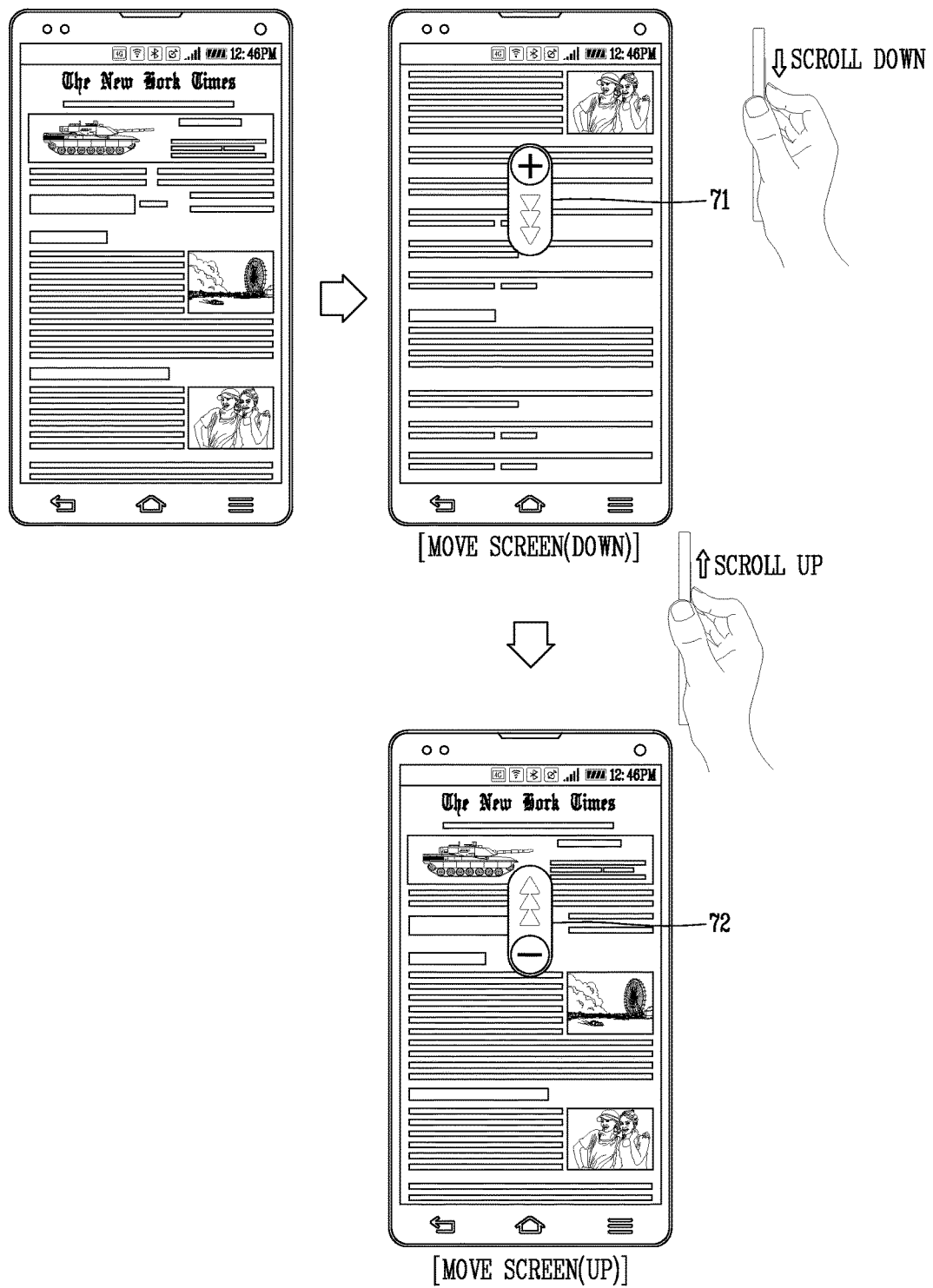
FIG. 10 is a view illustrating an embodiment of performing a screen scroll using the rear input unit.

FIG. 10 is a view illustrating an embodiment of performing a screen scroll using the rear input unit.

When a user scrolls down the rear input unit (up key hold & drag down) as illustrated in FIG. 9A in a state that a web browser is displayed on the display unit of the mobile terminal being held by the user, the screen moves downward while displaying the indicator 71.

Then, when the user scrolls up the rear input unit (down key hold & drag up) as illustrated in FIG. 9B, the screen moves upward while displaying an indicator 72. Accordingly, the present disclosure may perform a scroll up or down operation of the screen using the rear input unit.

In addition, though a downward movement and an upward movement are displayed with a "plus (+)" and a "minus (−)" icon, respectively, in FIG. 10, the present disclosure may not be necessarily limited to this, and they may be displayed vice versa.

For another embodiment, according to the present disclosure, both an upward move icon and a downward move icon may be displayed within one indicator when a specific button of the rear input unit is touched to allow the user to select.

Figure 11A:
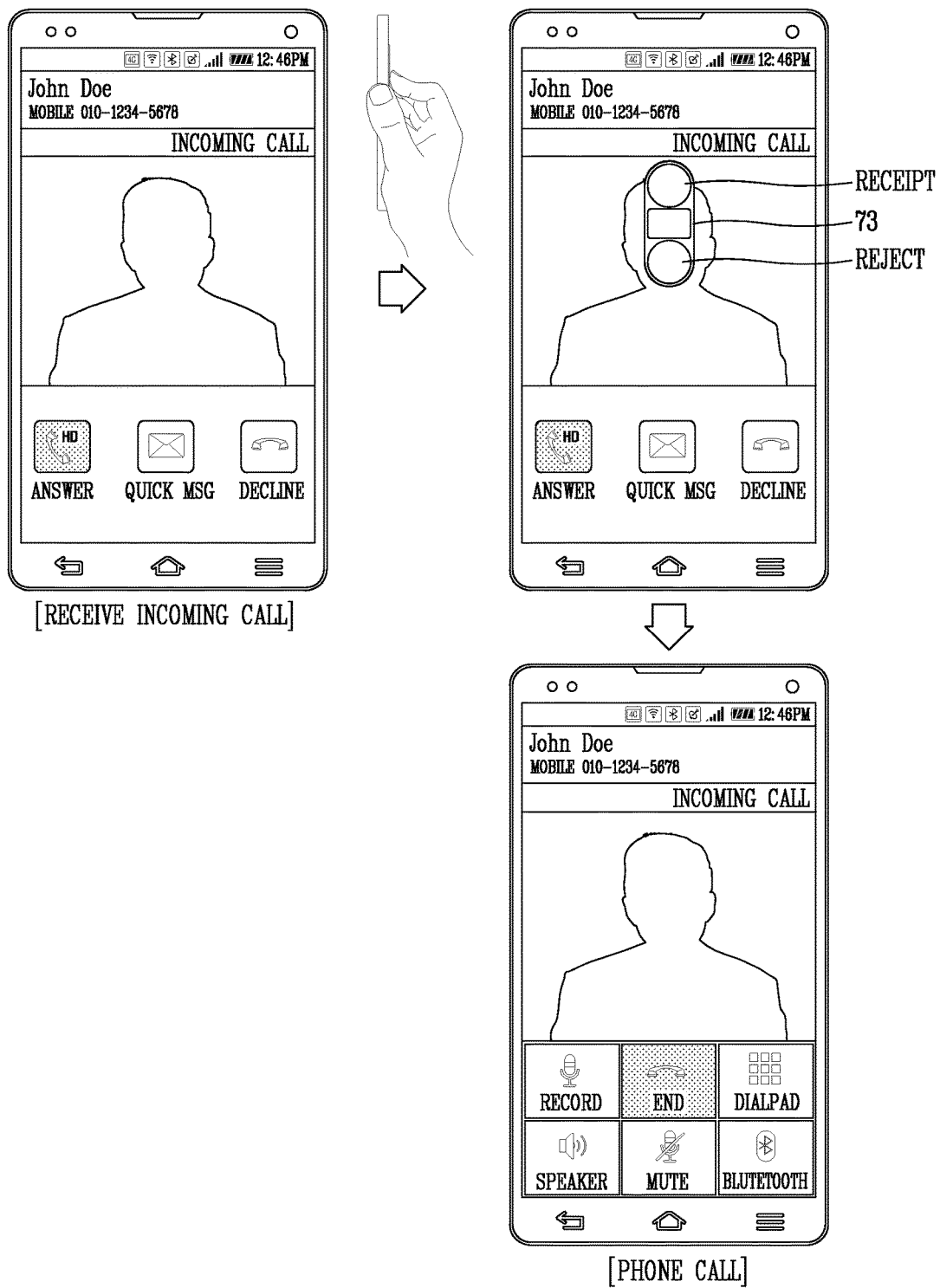
FIGS. 11A and 11B are views illustrating an embodiment of answering a call using the rear input unit.
Figure 11B:
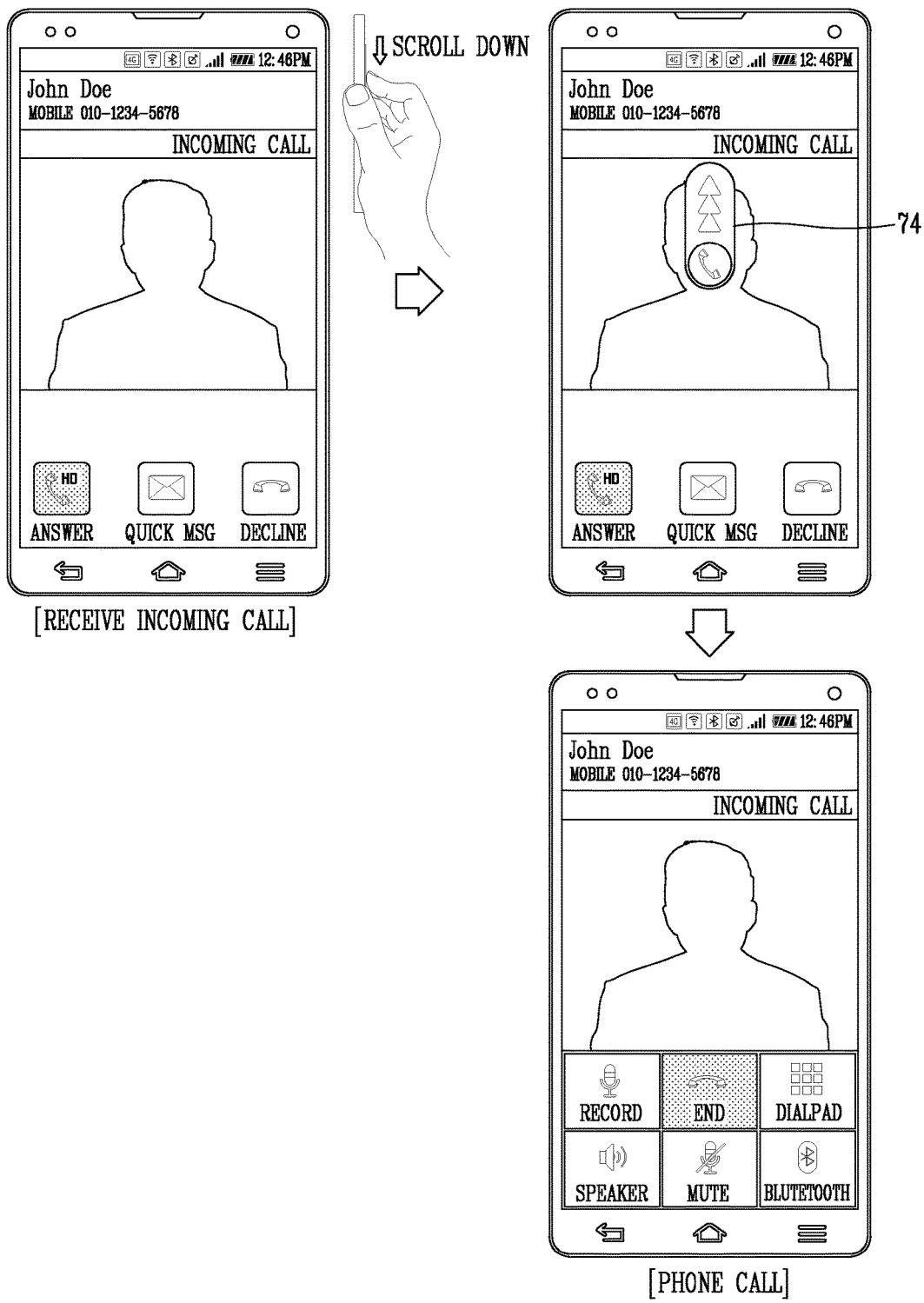

FIGS. 11A and 11B are views illustrating an embodiment of answering a call using the rear input unit.

As illustrated in FIG. 11A, when a user touches or presses the rear input unit when called on the phone, an indicator 73 indicating an incoming call function is displayed on the display unit 251. The indicator 73 may include an incoming call or call rejection icon, and therefore, the user may select his or her desired icon through the rear input unit to perform an incoming call function.

For another embodiment, as illustrated in FIG. 11B, when called on the phone, the user may directly scroll down (up key hold & drag down) the rear input unit to receive a cal. In this case, a call is connected with the counterpart user while displaying an indicator 74 indicating a call answer function on the display unit 251. An icon indicating that an incoming call function has been executed is displayed on the indicator 74.

The present disclosure may guide the position of a button placed on a finger on the rear input unit to the rear input unit to allow a user to easily control it. The guide may be displayed through an indicator as described above, and the indicator may be displayed at a position corresponding to a rear input to cover a field of view of the content, and thus can be moved to a user's desired position according to the user's touch input.

Figure 12:
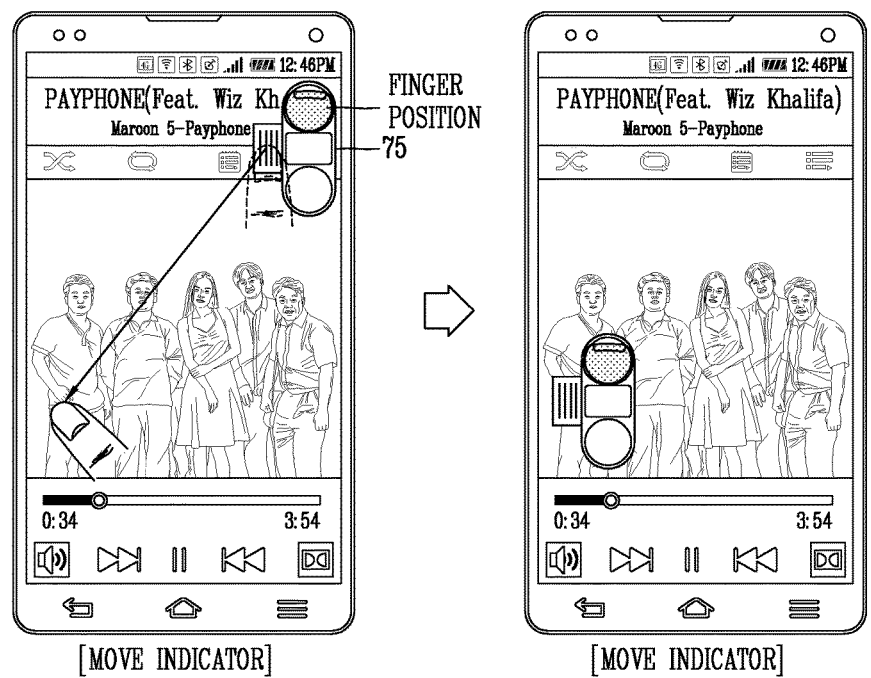
FIG. 12 is a view illustrating an embodiment of guiding the position of a button placed on a finger on the rear input unit to the front display unit.

FIG. 12 is a view illustrating an embodiment of guiding the position of a button placed on a finger on the rear input unit to the front display unit.

As illustrated in FIG. 12, when a user holds a mobile terminal with his or her one hand, and one finger of them is brought into contact with a specific button of the rear input unit, the controller 180 displays finger position information on an indicator 75 on the front display unit 251. For example, when a finger is placed on an up key of the rear input unit, the controller 180 displays the position of a current finger with a different color from those of the remaining buttons. Furthermore, the indicator 75 may be touched and dragged to move to the user's desired position.

The user may perform the foregoing various functions while viewing the position of a finger displayed on the indicator 75.

Figure 13:
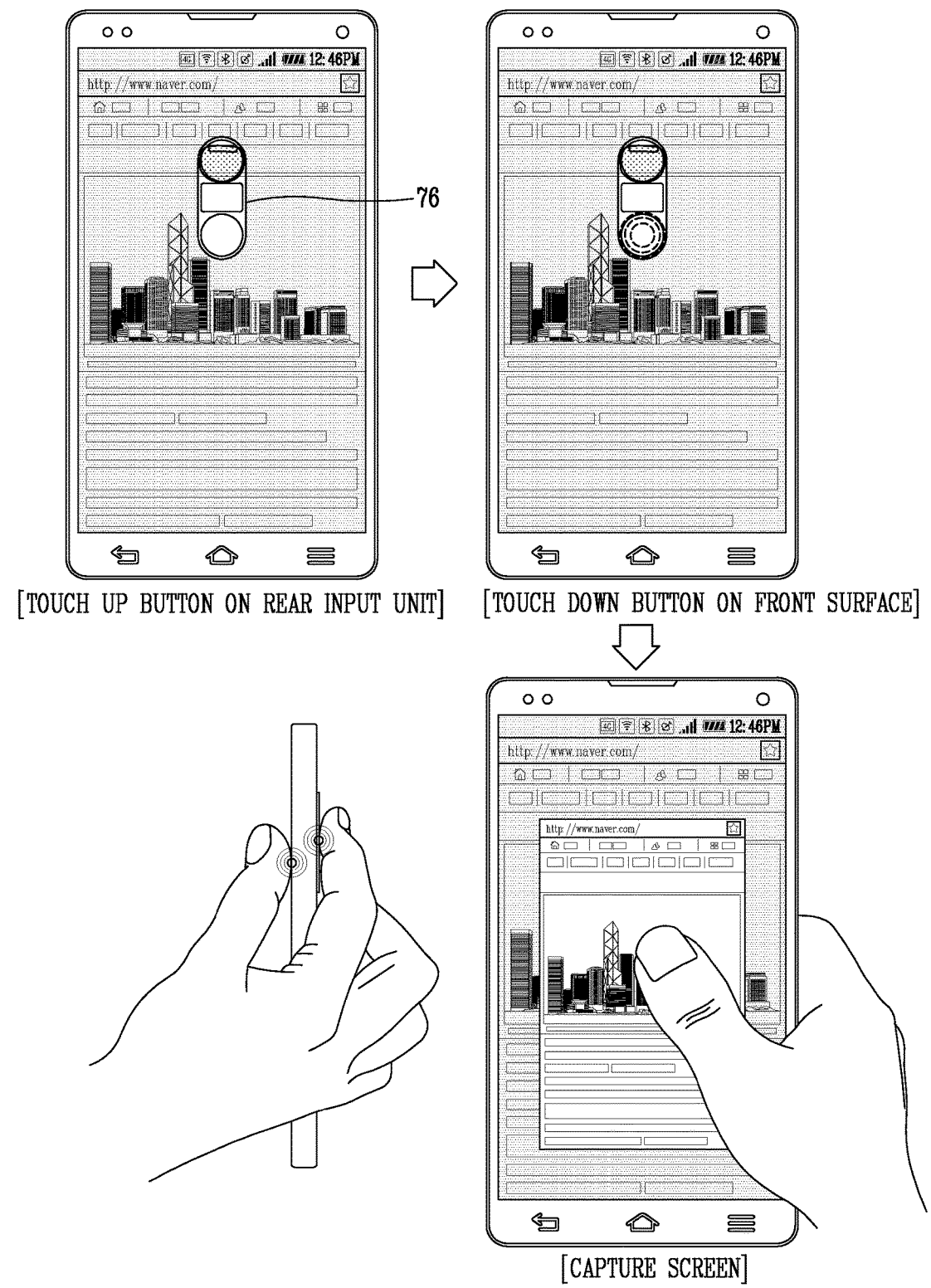
FIG. 13 is a view illustrating an for example of executing a screen capture operation while viewing a finger position guide.

FIG. 13 is a view illustrating an for example of executing a screen capture operation while viewing a finger position guide.

When a user touches an up button of the rear input unit with his or her forefinger while holding the mobile terminal with his or her one hand, the up button is displayed to be distinguished from other buttons on an indicator 76 of the front display unit 251. The distinction denotes being displayed in a different color or being highlighted. In this state, when a user touches a down button displayed on the indicator 76, a currently displayed screen is automatically captured.

In case of using the foregoing method, the user may know which button is currently being touched through the indicator 76, and thus additionally select another button on the indicator 76 even though the rear input unit is not seen, thereby conveniently performing his or her desired function (for example: capture).

FIGS. 14 through 17 are views illustrating an example of performing various functions on a mobile terminal according to an interaction with the rear input unit.

The interaction may include a touch input, a key press and a scrolling.

Figure 14:
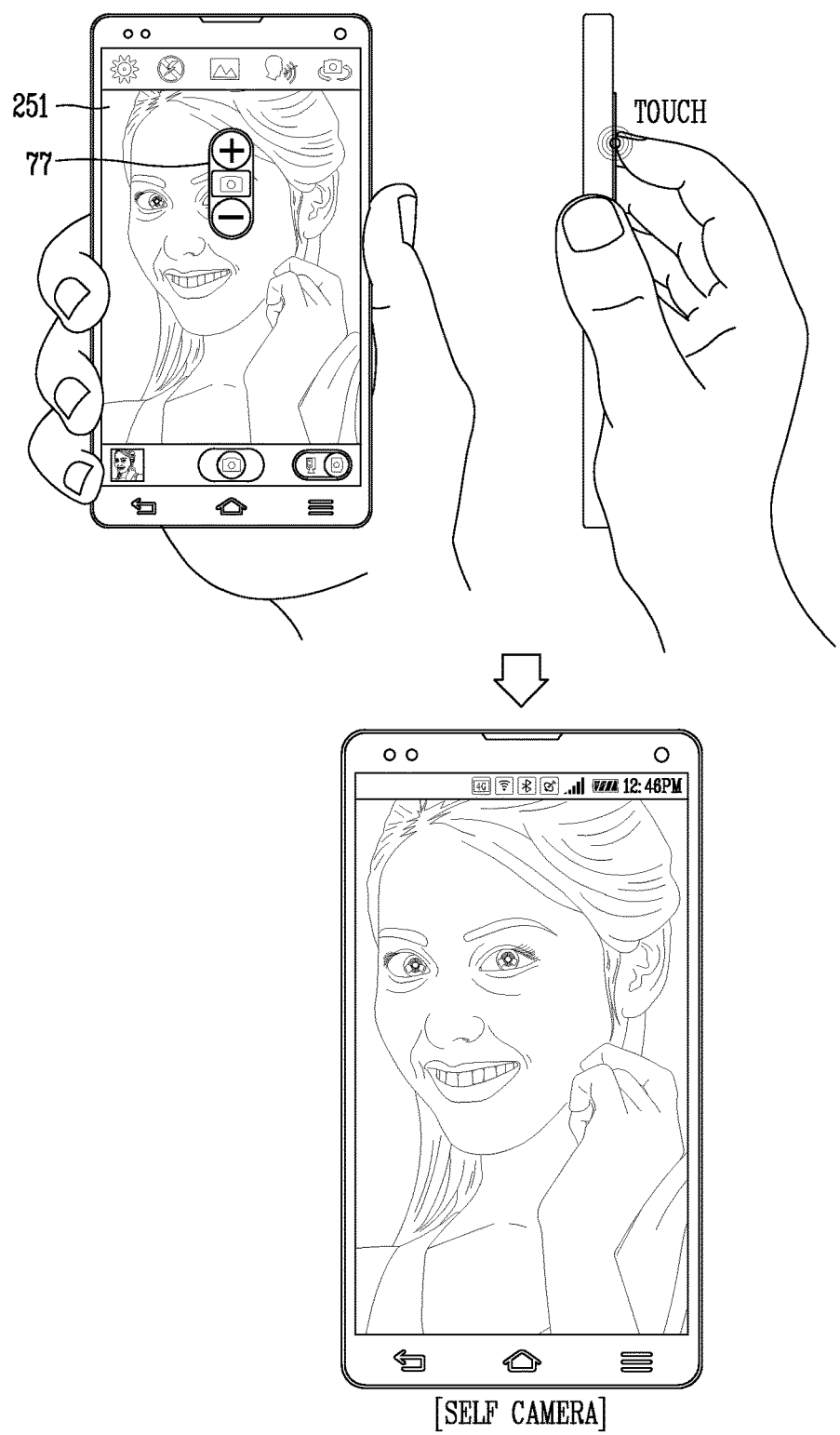
FIGS. 14 through 17 are views illustrating an example of performing various functions on a mobile terminal according to an interaction with the rear input unit.

FIG. 14 illustrates an example of performing a self camera function using the rear input unit.

A user selects a camera function while gripping the mobile terminal and then touches the rear input unit to display an indicator 77 indicating a camera function on the front display unit 251. The indicator 77 may include icons indicating a zoom-in, a zoom-out, and a camera function, and thus the user may perform a self camera capture that is difficult with a front touch while performing a zoom-in or zoom-out function.

Figure 15:
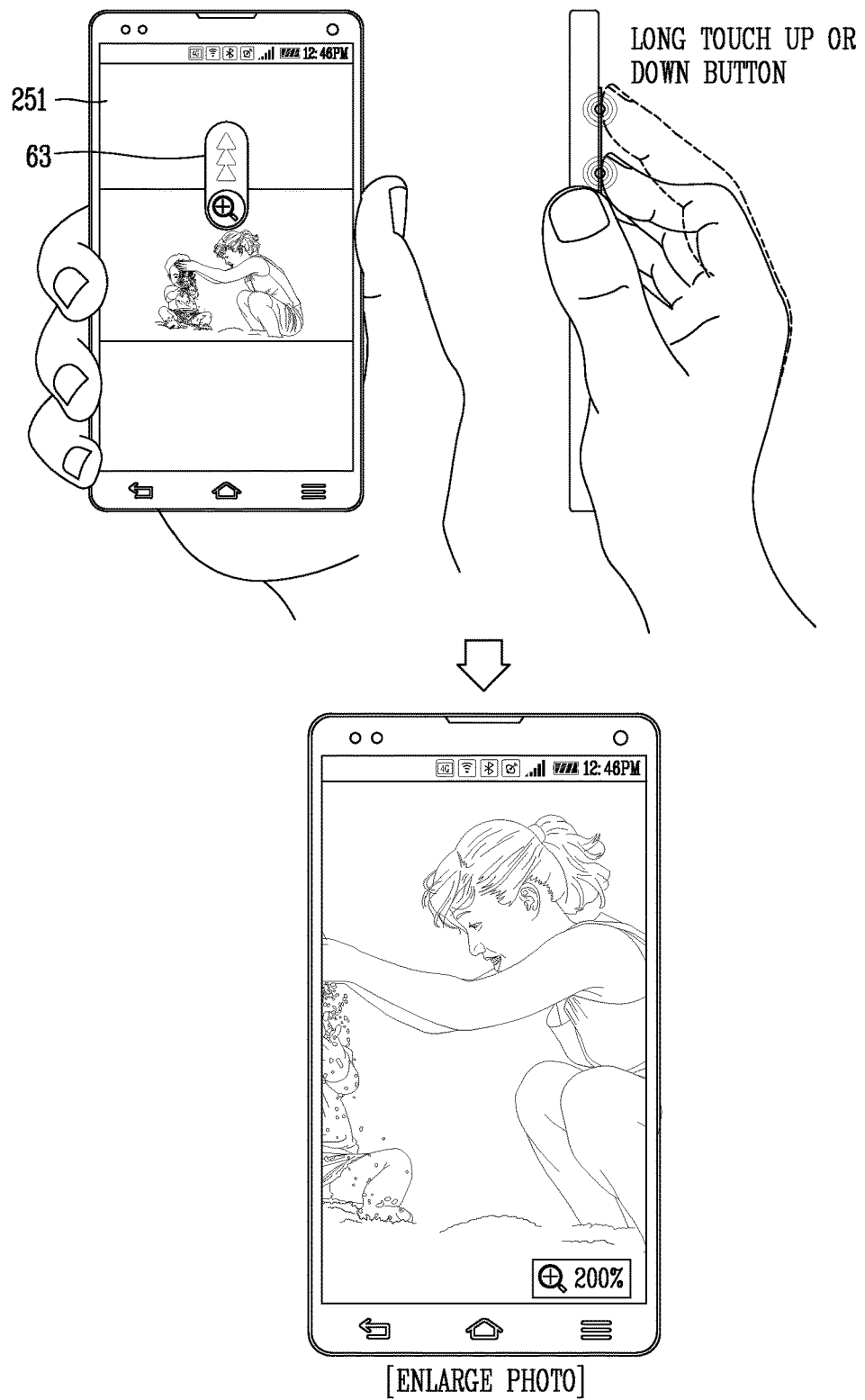

FIG. 15 illustrates an example of performing a zoom-in/out operation on an image using the rear input unit.

When a user selects a specific photo from an album, the selected photo is displayed on the display unit 251. In this state, the user may long touch an up button or down button of the rear input unit to perform an enlargement or reduction operation on the photo. Even in this case, the controller 180 displays the foregoing user's finger position and the relevant function through an indicator.

For example, as illustrated in FIG. 15, when a user touches an up button, an indicator indicating a finger position is displayed, and when the relevant button is long touched, a photo is displayed in an enlarged manner while switched to an indicator 63 indicating a zoom-in function. An enlargement ratio of the photo is determined by a long touch time and the enlargement ratio is displayed at one side thereof.

On the contrary, when the user long touches a down button, the photo is displayed in a reduced size while being switched to an indicator indicating a zoom-out function.

Furthermore, according to the present disclosure, a case of touching a specific button has been described as an example, but the present disclosure may not be necessarily limited to this, both zoom-in and zoom-out icons may be displayed within one indicator to allow the user to select as illustrated in FIG. 6C.

Figure 16:
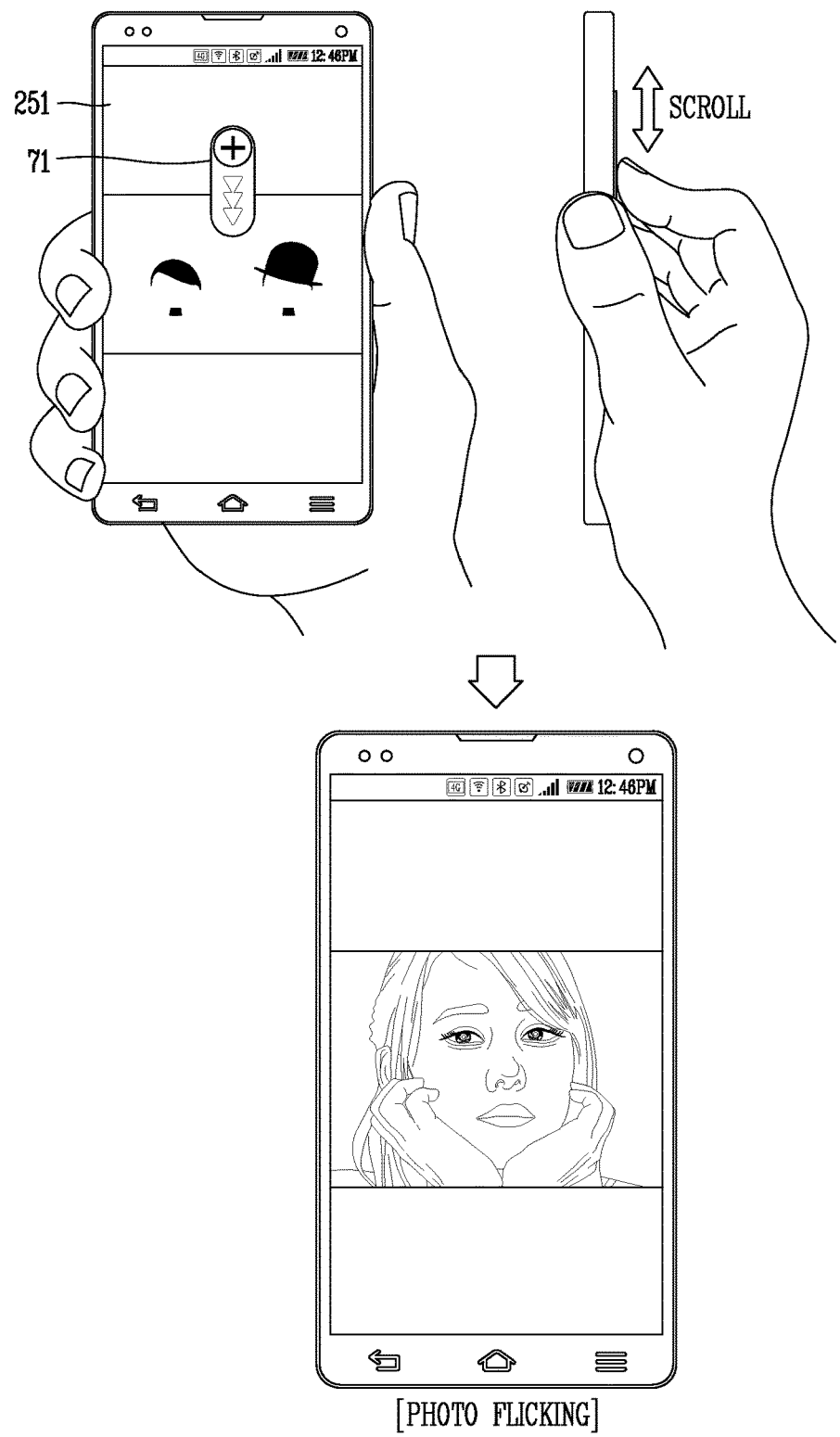

FIG. 16 illustrates another embodiment of FIG. 10 as an example of performing an image flicking using a scroll.

Referring to FIG. 16, when a user views a specific photo from an album then drags it downward while touching an up button of the rear input unit, namely, scrolls the rear input unit downward, a currently displayed photo is flicked while at the same time displaying an indicator 71 to display another photo on the display unit 251. On the contrary, when the user drags it upward while touching a down button of the rear input unit, namely, scrolls the rear input unit upward, a currently displayed photo is flicked again to display another photo on the display unit 251.

Figure 17:
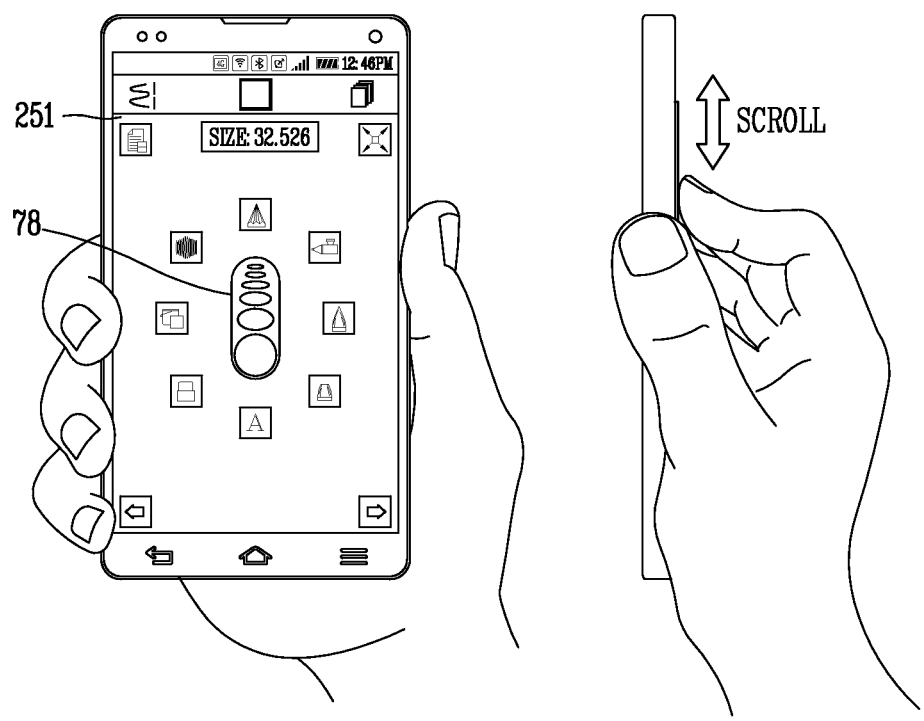

FIG. 17 illustrates an example of adjusting a point size of brush using a scroll.

As illustrated in FIG. 17, a user may execute a sketch application and then make a sketch with his or her one hand while holding the mobile terminal with the other hand. In this case, the user may scroll an up button or down button of the rear input unit to change a point size of brush. In this case, the controller 180 may display a finger position and a brush select function through an indicator 78.

Furthermore, the present disclosure has described a case of touching a specific button as an example, but may not be necessarily limited to this, both an increase or decrease icon for a point size of brush may be displayed within one indicator to allow the user to select.

According to the present disclosure, the rear input unit 232 may include a single button. In this case, a function defined by an input to any one of a plurality of buttons 233, 234a, 234b may be also applicable in a similar manner to a single button.

The rear input unit may be formed to scan a fingerprint on a user's finger for applying an input along with an input applied thereto. More specifically, a fingerprint recognition sensor (e.g., fingerprint scanner module) may be mounted on one surface (central button) of the button or a front surface thereof to recognize a finger's fingerprint and contact direction brought into contact with the button therethrough. The button is slidably formed by the push, thereby pressurizing a switch. When the switch is pressurized, the controller senses a push input to process control command corresponding to the relevant push input.

However, the present disclosure may not be necessarily limited to this the foregoing structure. For example, the push button may be replaced by touch button. More specifically, a fingerprint recognition sensor may be disposed on one surface (central button) of the touch button. Accordingly, according to an example which will be described below, an input through the button may be replaced by a touch input through a touch button.

From the foregoing configuration of the rear input unit, the present disclosure may provide a scheme of allocating at least one or more functions executable on each module to guide them to the front display unit when a user's first input to the rear input unit is sensed, and recognizing the direction of the relevant input through the fingerprint recognition sensor to execute a function allocated to the relevant direction when a second input is sensed.

The first input may be an input to a specific button, for example, an input to a central button, and the second input may include an input to all buttons constituting the rear input unit.

The rear input unit is implemented with a physical button (or key) or touch button, and may include a fingerprint recognition sensor in part or the whole thereof.

The functions allocated to each direction may be guided through a guide section (or indicator).

The guide section may be displayed at the same front position to correspond to a shape and position of the rear input unit, and may include at least one icon. The icon may include an icon indicating each function in at least one of upward, downward, left and right directions and an icon indicating a manipulation direction of the rear input unit to select each function.

The guide section is displayed in a transparent or semi-transparent manner when a first input is applied to the rear input unit, and disappears unless a second input is sensed within a predetermined period of time. The first and the second input may include a short press, a touch and a proximity touch.

A function displayed on the guide section, as a plurality of functions currently executable on the screen with the rear input unit, is allocated and displayed for at least one of upward, downward, left and right directions within the guide section.

The second input is an input for selecting a function displayed for each direction on the rear input unit, and the direction of the second input may be sensed by the fingerprint recognition sensor provided on the rear input unit.

The present disclosure may perform not only a button input but also fingerprint recognition through the fingerprint recognition sensor upon sensing a user input to the rear input unit. It is to mostly prevent the functions and applications of the mobile terminal from being activated or deactivated due to a user's unintentional control command input to a press or touch input enabled mobile terminal.

Figure 18:
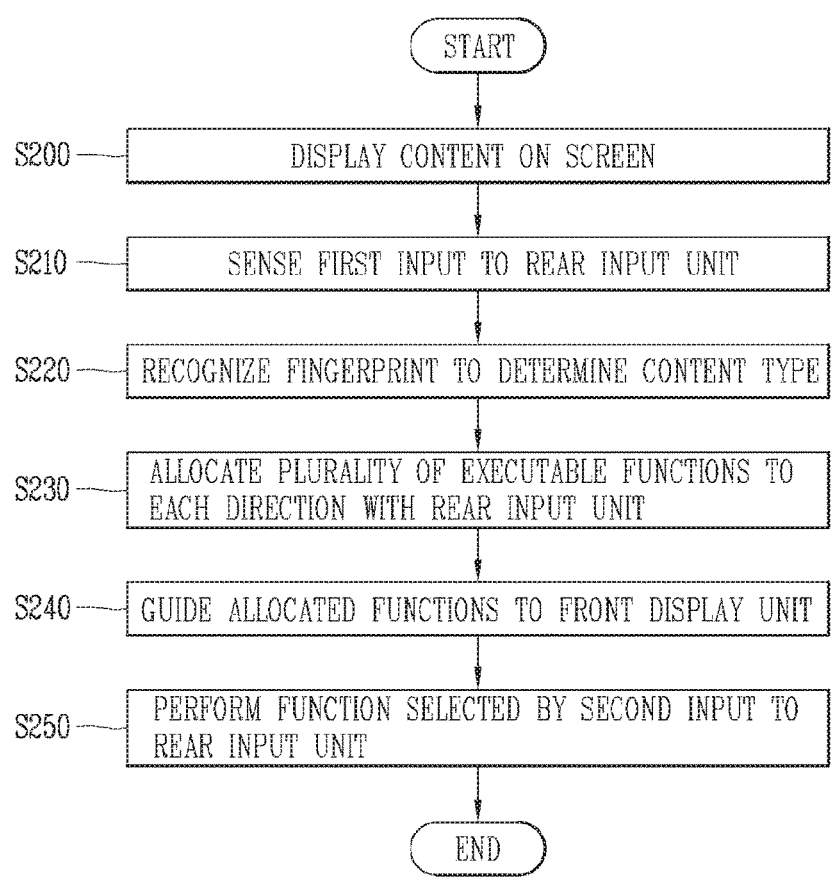
FIG. 18 is a flow chart illustrating a second embodiment of a rear input unit operation method of a mobile terminal according to an embodiment of the present disclosure.

FIG. 18 is a flow chart illustrating a second embodiment of a rear input unit operation method of a mobile terminal according to an embodiment of the present disclosure. In this case, the guide section will be described as an indicator, for example.

As illustrated in FIG. 18, a user may display a content on the display unit 151 or 251 while holding a mobile terminal with his or her one hand (S200). The content may be a content or application selected by the user or a content or application activated by an external event (incoming call, incoming mail). The content may include an image, a video (including moving images), a text, a webpage, and the like.

Then, when a first input is sensed on a central button 233 of the rear input unit from a user (S210), the controller 180 may authenticate the relevant user based on a fingerprint sensed on the fingerprint recognition sensor and then allocate a plurality of content related functions that can be carried out by the rear input unit, more particularly, that can be carried out by buttons provided on the rear input unit, for each direction based on a currently displayed content (S220, S230). For an example, when a photo is currently displayed on the display unit 251, four functions (zoom in, zoom out, previous and next) may be allocated the top, bottom, left and right. If the fingerprint has not been registered and failed user authentication, then the controller 180 may display a warning message without performing the operation.

The fingerprint recognition function may prevent the terminal from being operated due to an unintentional press to a button of the rear input unit.

The allocated functions are guided through an indicator on the front display unit 251 (S240), and the each function is displayed in the allocated direction. The indicator may be displayed in a transparent or semi-transparent manner. A method of selecting the relevant function along with a name of the function, namely, which button should be pressed in which direction on the rear input unit to select the relevant function, is displayed in an arrow shaped icon. The function selection method may not be necessarily limited to an arrow, and displayed with different icon according to a user's selection.

Accordingly, the user may manipulate (press or scroll) a second input, namely, a button, to the rear input unit to select his or her desired function according to functions and a method of selecting each function displayed on the indicator, and the controller 180 may recognize a user's button manipulation direction based on a recognition result of the fingerprint recognition sensor to perform a function allocated to the relevant direction (S250).

Figure 19:
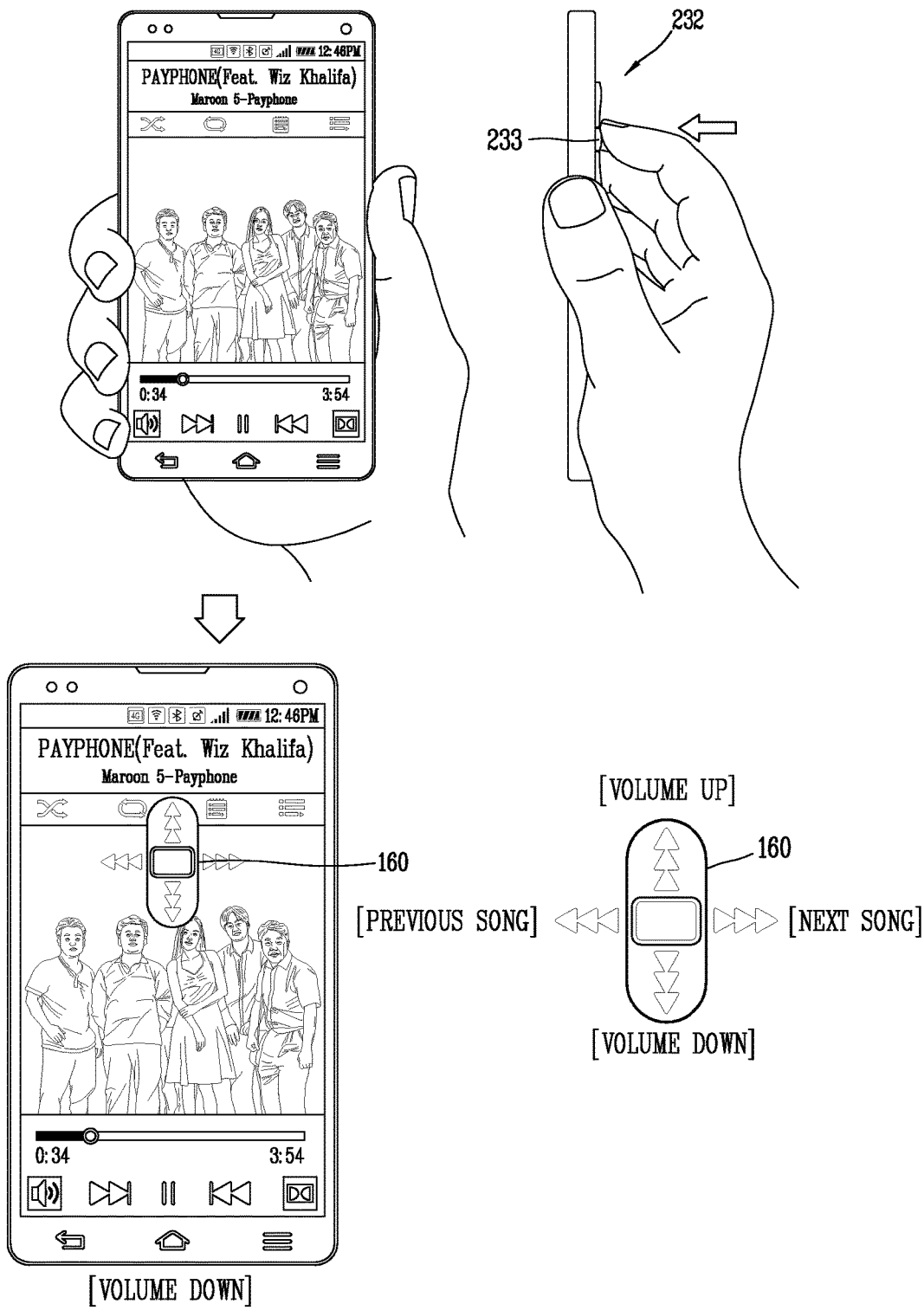
FIG. 19 is a view illustrating an embodiment of allocating functions that can be carried out by the rear input unit on a music playback screen for each direction to visually guide them.

FIG. 19 is a view illustrating an embodiment of allocating functions that can be carried out by the rear input unit on a music playback screen for each direction to visually guide them.

As described above, the up button 234a, the central button 233 and the down button 234b provided on the rear input unit 232 may perform different functions for a content currently executed on the display unit 251. However, it may be difficult for the user to know which function to be carried out by each button of the rear input unit 232.

FIG. 19 illustrates an example in which the rear input unit is implemented in a physical key, but the present disclosure may not be necessarily limited to this, and may be also applicable in a similar manner to a case where the rear input unit is implemented in a touch button.

Various contents (video, image, text) executed by a user may be displayed on the display unit 251 of the mobile terminal. The present embodiment illustrates a case where music is played back along with an image on the display unit 251 as an example.

When the user puts his or her finger on the central button 233 of the rear input unit 232 while holding the terminal (first input), a plurality of functions that can be currently executed by the rear input unit 232 on the screen are allocated to each direction and displayed on the front display unit 251 through an indicator 160 (or guide section). A direction and number of functions guided on the indicator 160 is determined according to a type of the currently executed content.

For example, as illustrated in FIG. 19, when the central button 233 of the rear input unit 232 is touched (for example, "knock-knock") in a state that music is being currently played back on the display unit 251, a plurality of functions associated with music playback, for example, volume up, volume down, next song, previous song, and the like are allocated to each direction and displayed on the indicator 160. A selection direction of the relevant function along with a name of the function are displayed in an icon shape.

Accordingly, the user manipulates each button of the rear input unit 232 according to the direction of a function displayed on the indicator 160 (second input), the direction of the relevant button manipulation is recognized using the fingerprint recognition sensor provided on each button to select and execute a function allocated to the relevant direction. For example, the up button 234a or down button 234b may be pressed to increase or decrease a volume of the relevant music, and the central button 233 may be scrolled in a horizontal direction to select a previous or next song. If the rear input unit 232 is configured with a touch button, then the manipulation direction of a button may be sensed without using the fingerprint recognition sensor.

Figure 20:
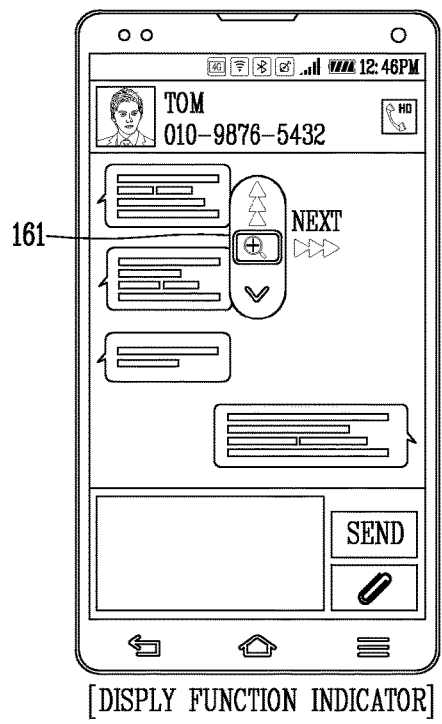
FIG. 20 is a view illustrating an embodiment of allocating functions that can be carried out by the rear input unit on a message screen for each direction to visually guide them.
Figure 20:
Figure 20:
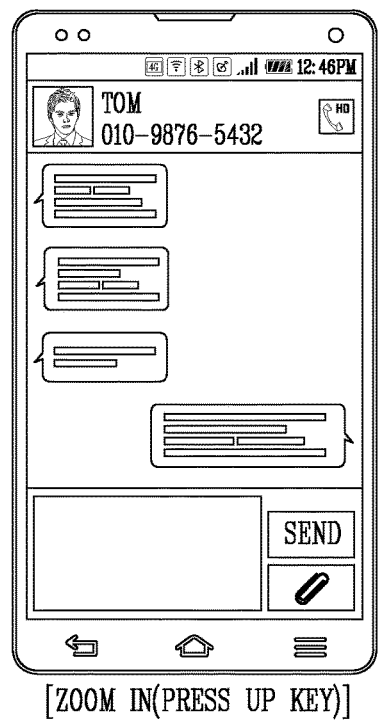
Figure 20:
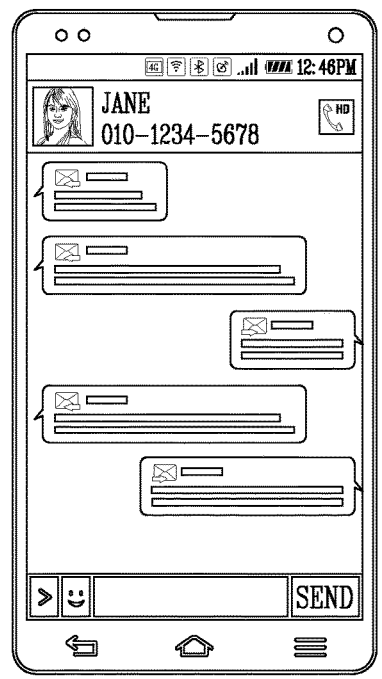

FIG. 20 is a view illustrating an embodiment of allocating functions that can be carried out by the rear input unit on a message screen for each direction to visually guide them.

Referring to the present drawing, a user's message sent to or received from another user may be displayed on the display unit 251. When the user slightly presses the central button 233 of the rear input unit 232 with his or her finger (first input) while viewing the content of the message, as illustrated in FIG. 20, a plurality of functions currently executable through the rear input unit 232 are allocated to each direction and displayed on an indicator 161. The function may include an enlargement function and a next message view function.

Then, when the user presses the up button 234a of the rear input unit 232 again, a zoom-in function is selected to enlarge the message, and the relevant direction is recognized through the fingerprint recognition sensor when scrolling the central button 233 in a right direction to select and execute a next message view function for displaying a prestored next message.

Figure 21:
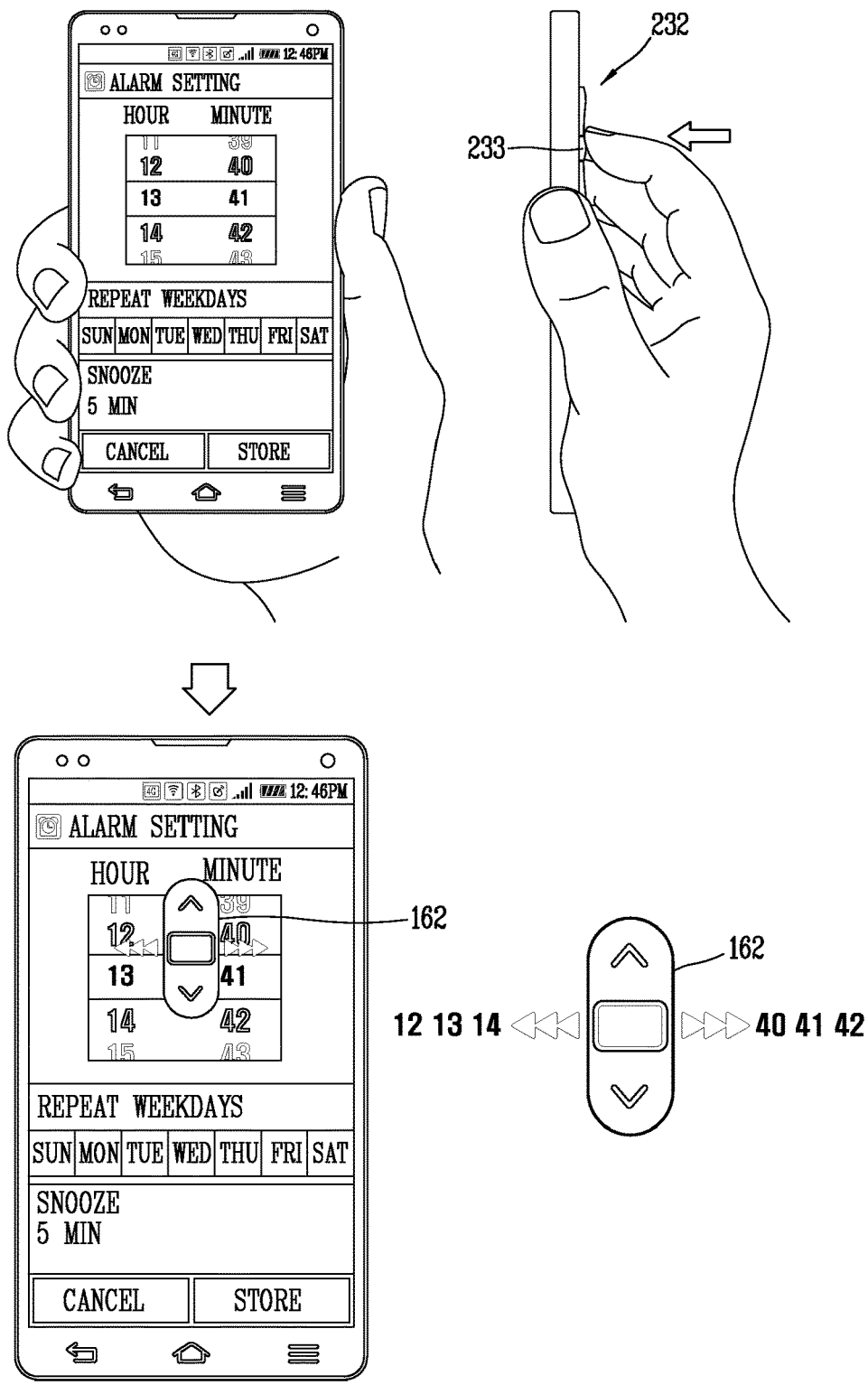
FIG. 21 is a view illustrating an embodiment of guiding functions that can be carried out by the rear input unit on a time setting screen for each direction.

FIG. 21 is a view illustrating an embodiment of guiding functions that can be carried out by the rear input unit on a time setting screen for each direction.

A user may display an application associated with a time (year, month, day, hour, minute) setting such as an alarm setting. When the user touches the button 233 of the rear input unit 232 in a state that the foregoing application is displayed, at least one or more functions that can be carried out by the rear input unit 232 on a time setting screen are allocated to each direction and displayed within an indicator 162. At this time, the function may be allocated and displayed on icons in a left and a right direction of the indicator 162, respectively, as an hour (12, 13, 14, . . . ) and a minute (40, 41, 42, . . . ) setting function.

Accordingly, the user may scroll the central button 233 of the rear input unit 232 in a left and a right direction to set a desired alarm time.

Figure 22A:
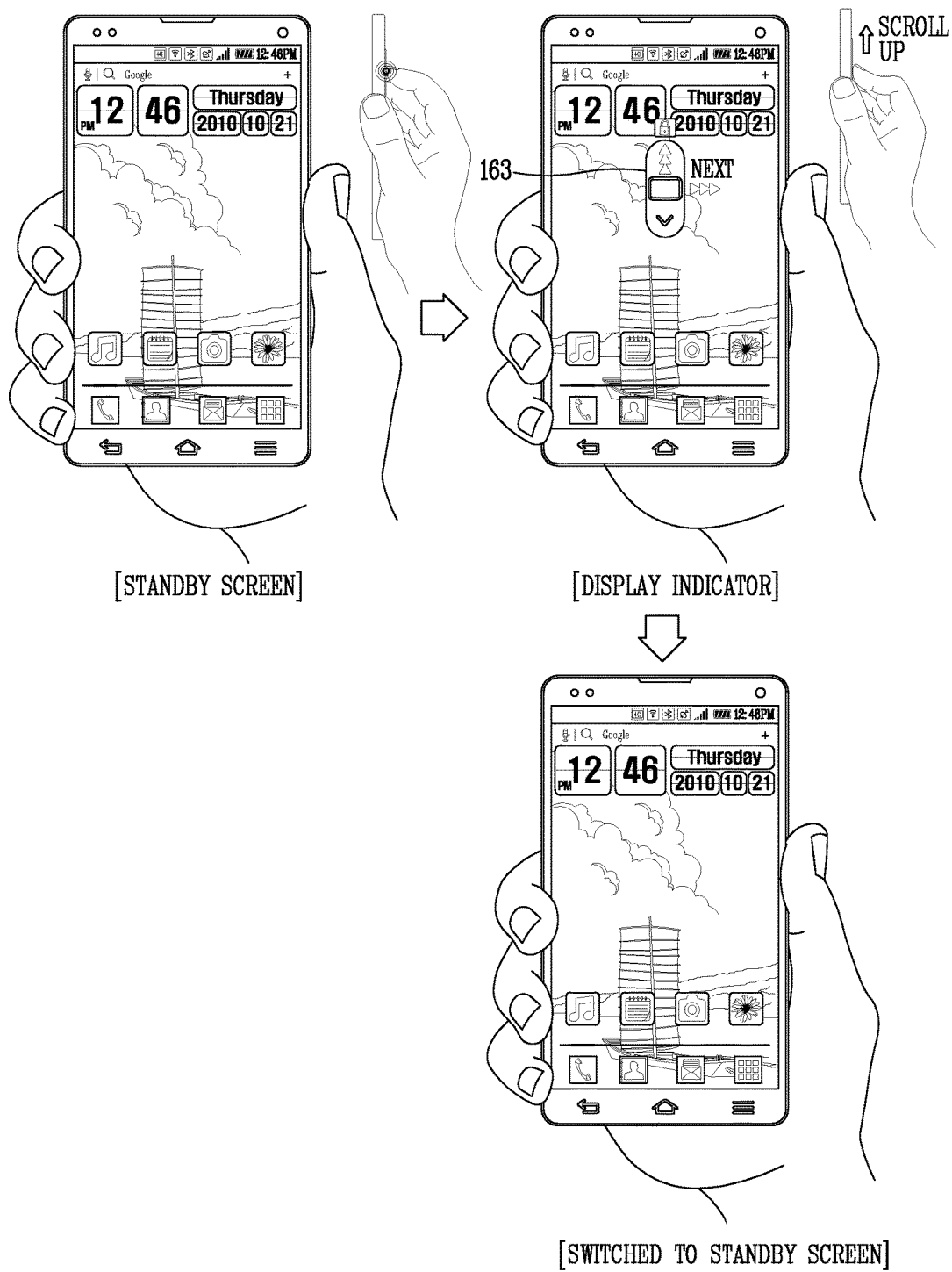
FIGS. 22A and 22B are views illustrating an embodiment of guiding functions that can be carried out by the rear input unit on a standby or locked screen for each direction.
Figure 22B:
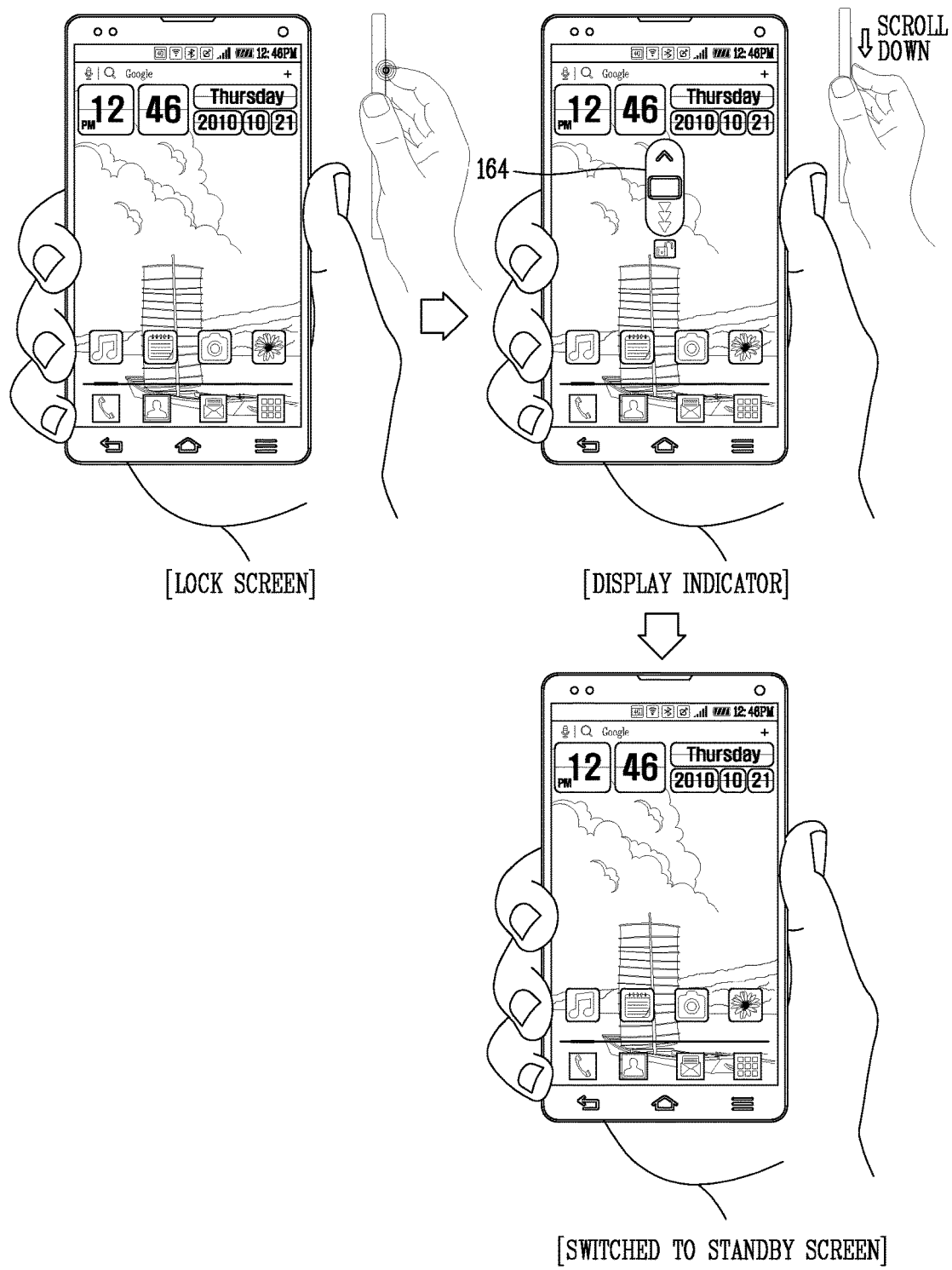

FIGS. 22A and 22B are views illustrating an embodiment of guiding functions that can be carried out by the rear input unit on a standby or locked screen for each direction.

As illustrated in FIG. 22A, when a user presses the button 233 of the rear input unit 232 in a state that a standby screen displayed, lock functions that can be carried out by the rear input unit 232 on the standby screen, namely, a lock function allocated to an upward direction and a next standby screen view function allocated to a right direction, are displayed on an indicator 163 of the front display unit 251.

The user may scroll the central button 233 in an upward direction along an icon direction guided on the indicator 163 or select an up button to select a screen lock function, and scroll the central button 233 in a right direction to select a different standby screen.

Furthermore, as illustrated in FIG. 22B, when a user presses the button 233 of the rear input unit 232 in a state that a lock screen is displayed, a lock release function that can be carried out by the rear input unit 232 on the lock screen is allocated to a downward direction and displayed on an indicator 164 of the front display unit display unit 251. The user may scroll the central button 233 in an icon direction (downward direction) guided on the indicator 164 to release the lock screen.

Figure 23:
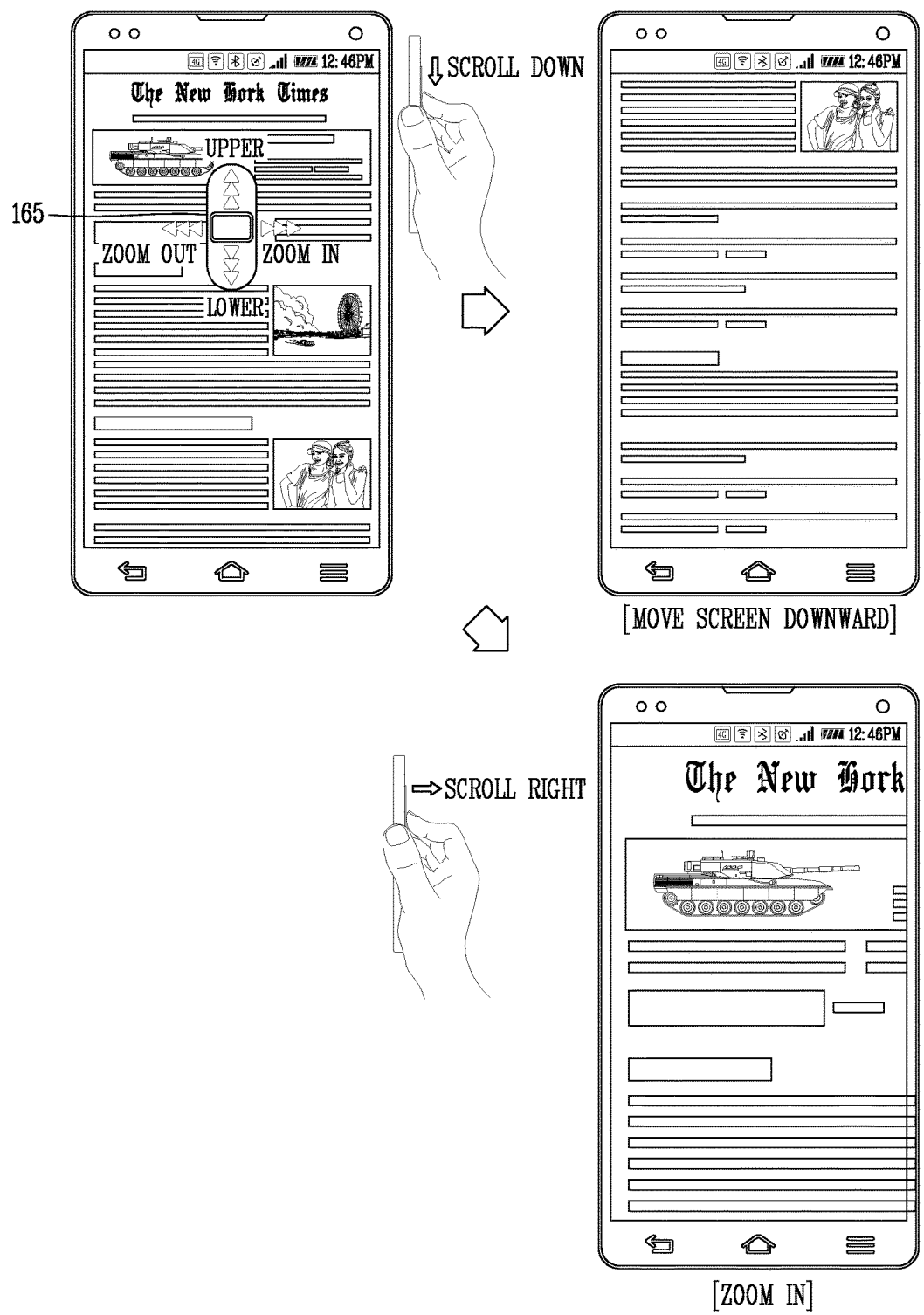
FIG. 23 is a view illustrating an embodiment of guiding functions that can be carried out by the rear input unit on a web screen for each direction.

FIG. 23 is a view illustrating an embodiment of guiding functions that can be carried out by the rear input unit on a web screen for each direction.

When a user presses the button 233 of the rear input unit as illustrated in FIG. 23 in a state that a webpage is displayed on the display unit 251 of the mobile terminal being held the user, a plurality of functions that can be carried out by the rear input unit 232 on the webpage are allocated to front, rear, left and right directions and displayed on an indicator 165 of the front display unit 251. The allocated functions are page movement (upward and downward movement) and size adjustment (zoom-in and zoom-out) functions. The user checks a function currently executable by the rear input unit on the indicator 165, and then manipulates each button of the rear input unit according to the direction information to execute the relevant function. In other words, the central button 233 is scrolled in a downward direction when it is desired to move a page in a downward direction, and the central button 233 is scrolled in a right direction to execute a zoom-in function when it is desired to enlarge a page.

Figure 24:
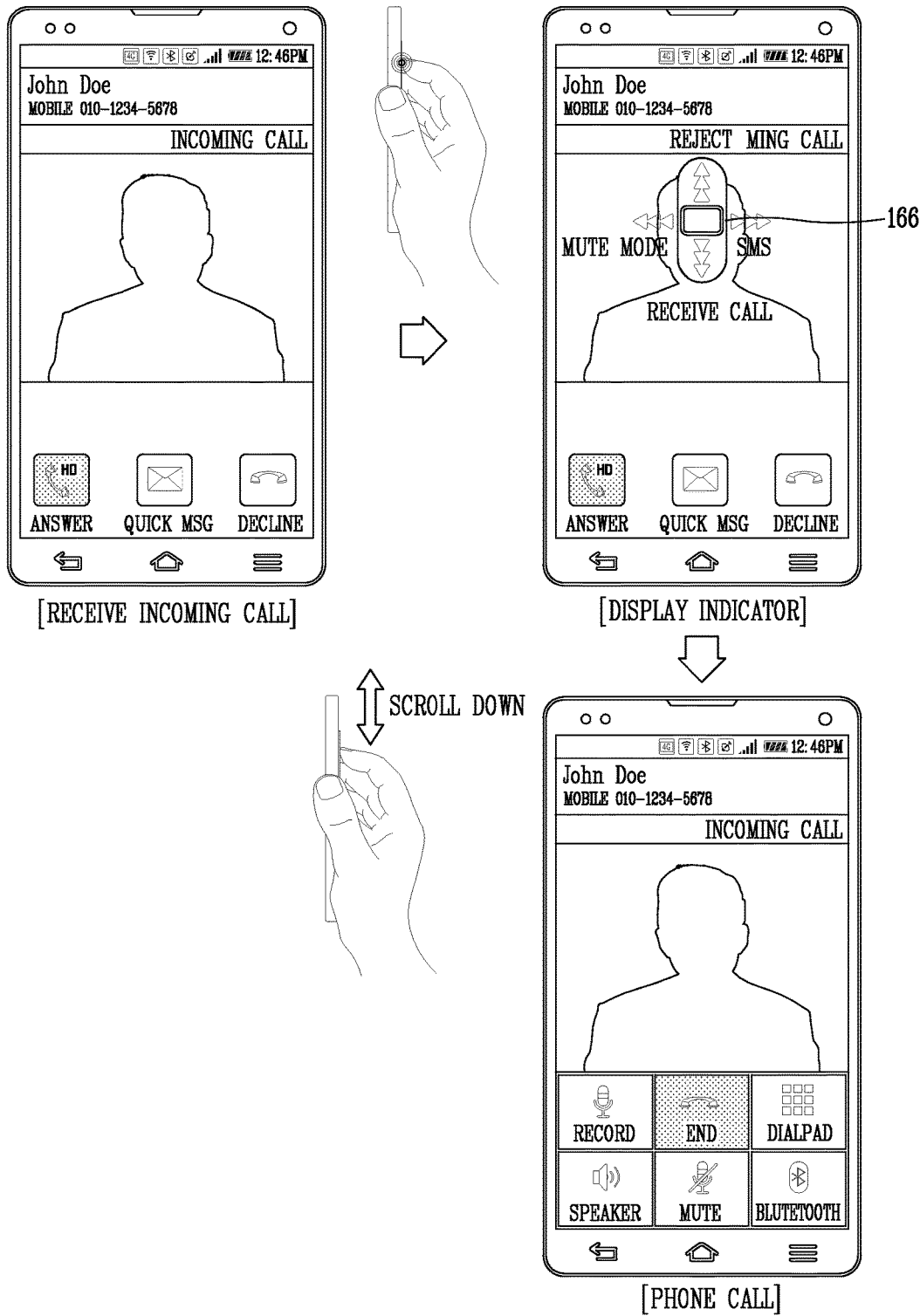
FIG. 24 is a view illustrating an embodiment of guiding functions that can be carried out by the rear input unit on an incoming call screen for each direction.

FIG. 24 is a view illustrating an embodiment of guiding functions that can be carried out by the rear input unit on an incoming call screen for each direction.

As illustrated in FIG. 24, when a user presses the button 233 of the rear input unit upon receiving a call from an outside, functions currently executable on the screen by the rear input unit are allocated to each direction on the display unit 251 and displayed on an indicator 166. Rejecting a call, answering a call, a mute mode and an SMS send operation or the like are allocated to front, rear, left and right directions, respectively, as available functions upon receiving a call based on the central button and displayed on the indicator 166.

The user checks each function on the indicator 166 and then manipulates each button of the rear input unit according to the direction information to execute his or her desired function. For example, the central button 233 may be scrolled in a downward or upward direction to answer or reject a call, and the central button 233 may be scrolled in a left or right direction to perform a mute mode, an SMS send operation, or the like. At this time, the user's scroll direction may be recognized through the fingerprint recognition sensor provided on the central button 233.

Figure 25:
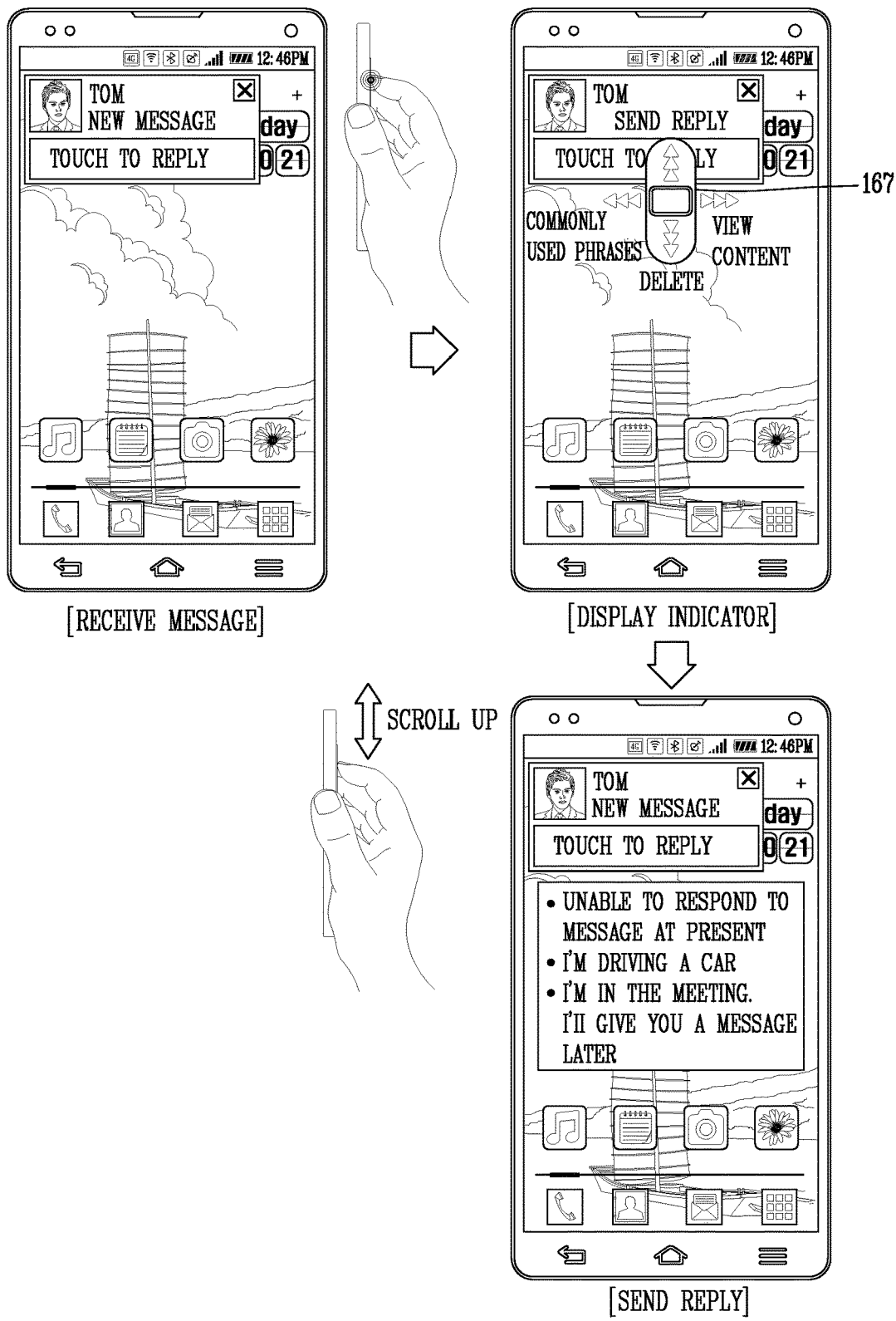
FIG. 25 is a view illustrating an embodiment of guiding functions that can be carried out by the rear input unit on an incoming message screen for each direction.

FIG. 25 is a view illustrating an embodiment of guiding functions that can be carried out by the rear input unit on an incoming message screen for each direction.

As illustrated in FIG. 25, upon receiving a predetermined message, the summary information of the received message is displayed on the display unit 251. When a users presses the central button 233 of the rear input unit, message related functions that can be carried out by the rear input unit are allocated to each direction within an indicator 167 on the display unit 251. Functions such as sending a reply, delete, commonly used phrases, viewing content, and the like are allocated to allocated to front, rear, left and right directions, respectively, as message related functions upon receiving a call based on the central button and displayed on the indicator 167. The foregoing functions are shown in an exemplary manner for the description, and the present disclosure may not be necessarily limited to this.

The user may manipulate a button within the rear input unit while viewing each function displayed within the indicator 167 and an execution direction of the relevant function to perform his or her desired function. For example, the central button 233 may be scrolled in a downward direction or upward direction to delete a message or send a reply, and the central button 233 may be scrolled in a left or right direction to perform commonly used phrases or viewing content. If the central button 233 is scrolled in an upward direction to select a send reply function, in particular, when a user is unable to properly send a reply due to a meeting, driving a vehicle or the like, then a prestored message list may be displayed to allow the user to select his or her desired message and perform a send reply function.

Figure 26A:
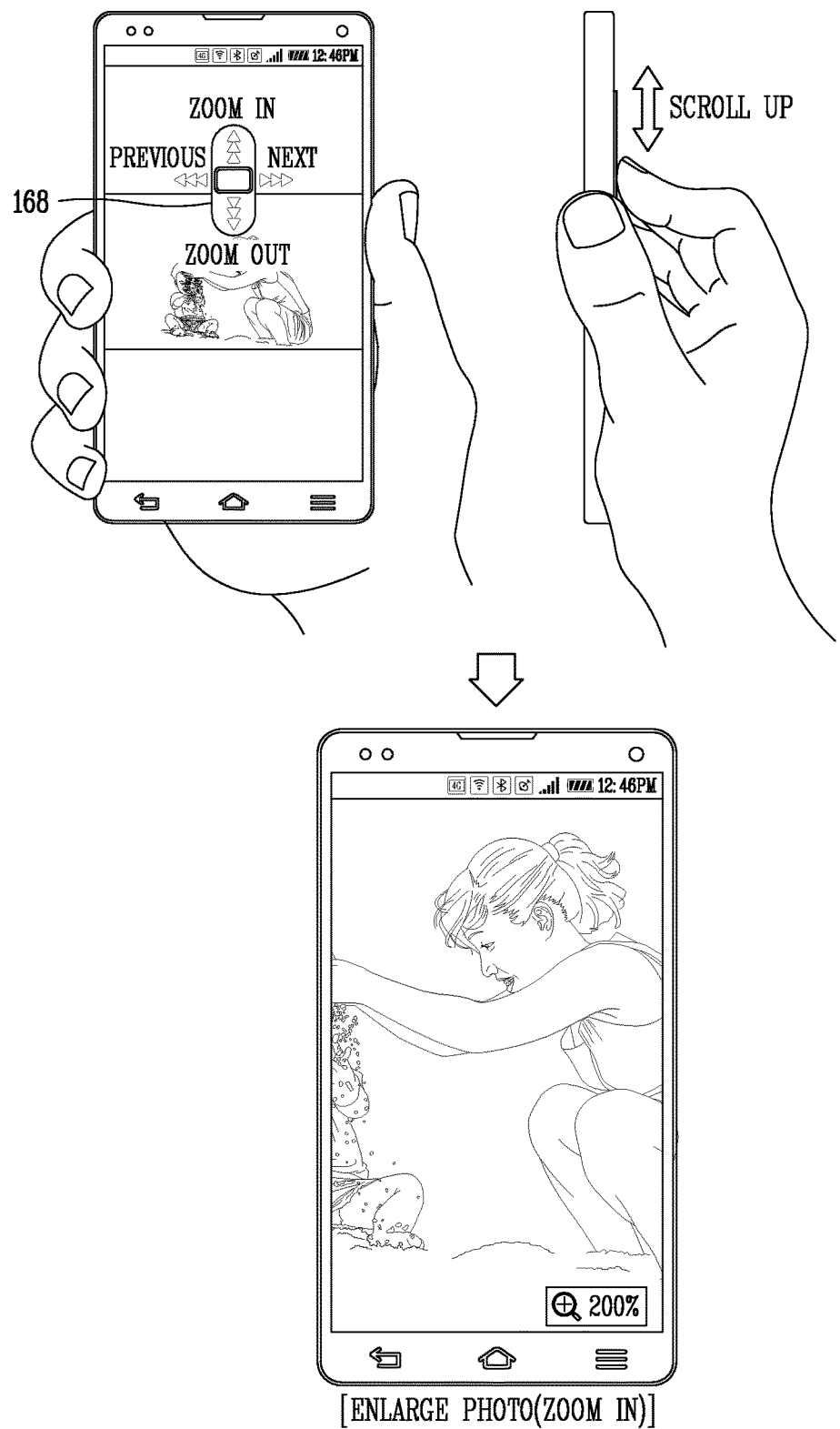
FIGS. 26A and 26B are views illustrating an embodiment of guiding functions that can be carried out by the rear input unit on an image screen for each direction.
Figure 26B:
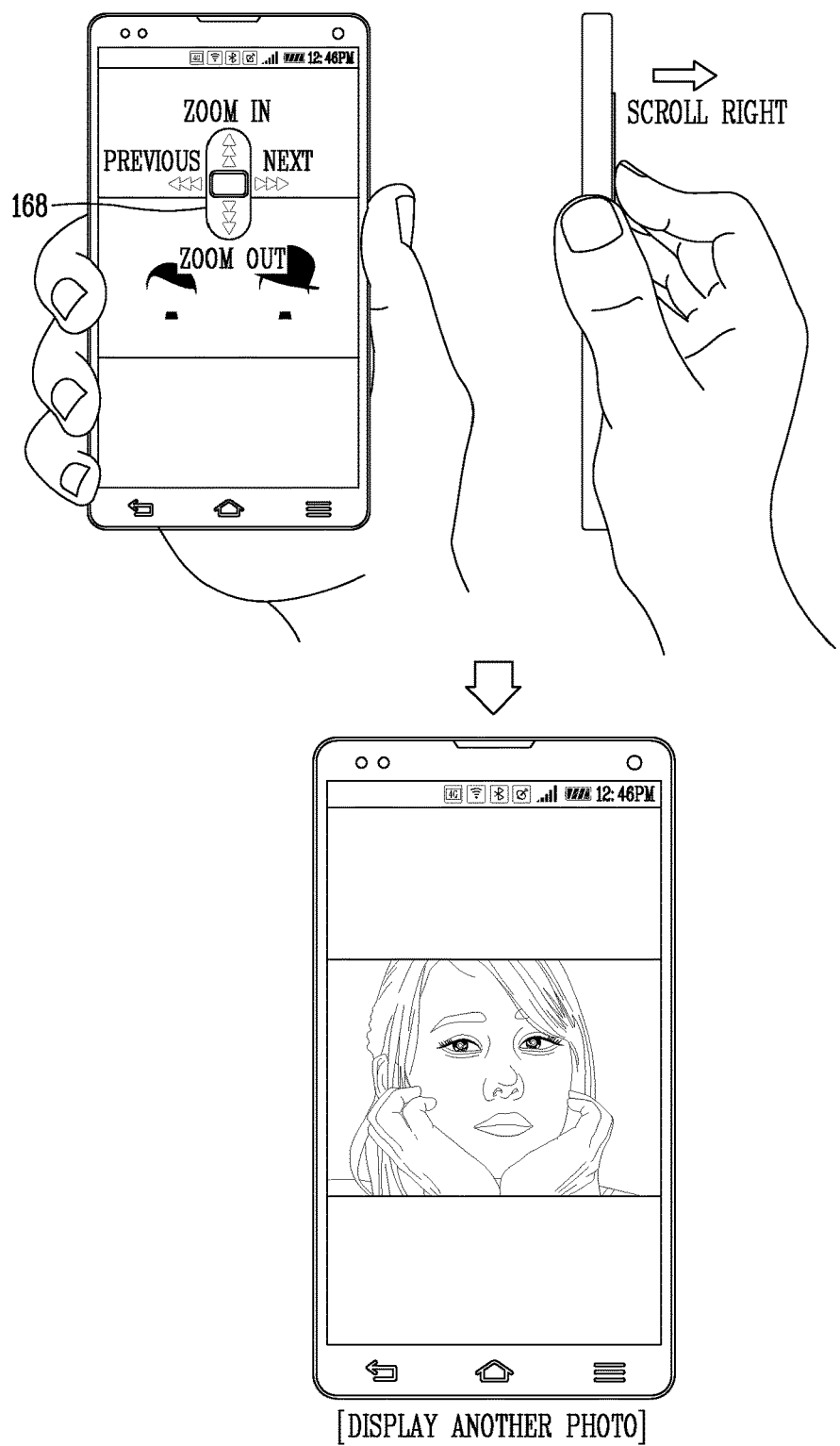

FIGS. 26A and 26B are views illustrating an embodiment of guiding functions that can be carried out by the rear input unit on an image screen for each direction.

A user may select a specific photo from an album to display it on the display unit 251. In this state, when the central button 233 of the rear input unit is pressed, photo related functions currently executable on the screen with the rear input unit are allocated to each direction and displayed within an indicator 168. Zoom-in, zoom-out, previous and next view functions are allocated to front, rear, left and right directions, respectively based on the central button 233 as photo related functions. The foregoing functions are shown in an exemplary manner for the description, and the present disclosure may not be necessarily limited to this.

The user may manipulate a button within the rear input unit while viewing each function displayed within the indicator 168 and an execution direction of the relevant function to perform his or her desired function. For example, a zoom function for a photo is selected to enlarge the relevant photo at a predetermined ratio when the central button 233 is scrolled in a upward direction as illustrated in FIG. 26A, and a next photo view function is selected to display a prestored next photo on a gallery when the central button 233 is scrolled in a right direction as illustrated in FIG. 26B. In this manner, the user may select and perform a zoom-out or previous photo view function for a photo.

The fingerprint recognition sensor (or fingerprint scanner module) may be used as a function key associated with power on/off. For example, when a button of the rear input unit is pushed in a state that the power of the terminal is off, fingerprint recognition is carried out while supplying power. the terminal determines whether or not the recognized fingerprint corresponds to a user's prestored fingerprint, and continuously proceed power-on and terminal booting when it corresponds thereto. As described above, a power-on command of the terminal may be carried out with two steps (fingerprint recognition and user interaction), thereby further reducing current consumption. In other words, a security function according to fingerprint recognition is given to a power-on operation, but the fingerprint recognition sensor will be turned off along with the terminal body without being continuously in an ON state.

Moreover, the foregoing case is a case where a user turns off the terminal, and thus when power-on and terminal booting are completed, the display unit may directly enter to a home screen page without going through a lock screen.

Furthermore, if the recognized fingerprint does not correspond to the user's fingerprint, then power-on and terminal booting as well as the foregoing indicator display and its related functions will stop. In this case, the terminal may display a warning message that it is not the user's fingerprint. The warning message may be carried out in the form of giving a lighting effect on a front surface of the terminal or outputting a sound effect for a predetermined period of time, for example.

Figure 27A:
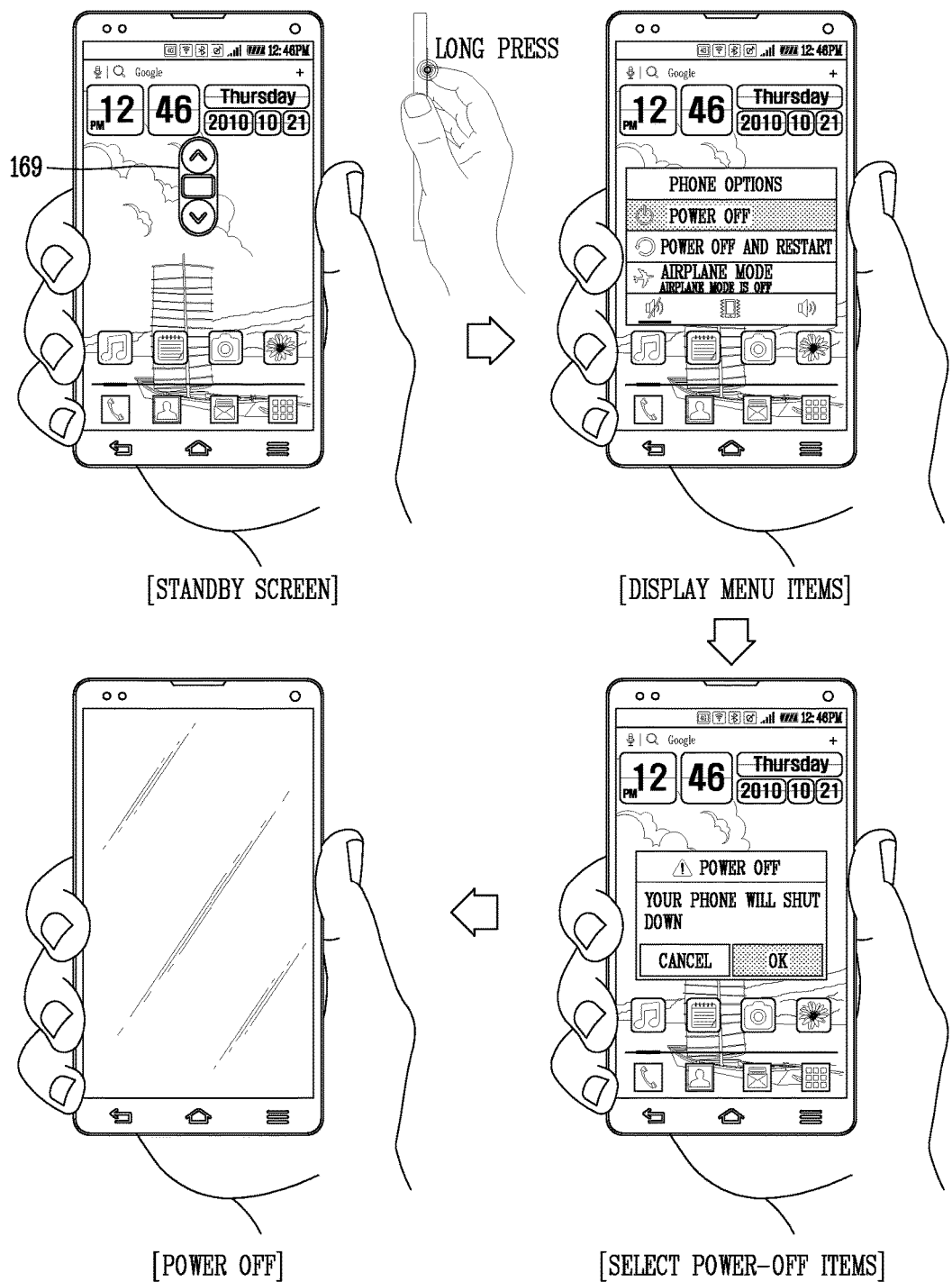
FIGS. 27A and 27B are views illustrating an embodiment of turning on or off the display unit using the rear input unit.
Figure 27B:
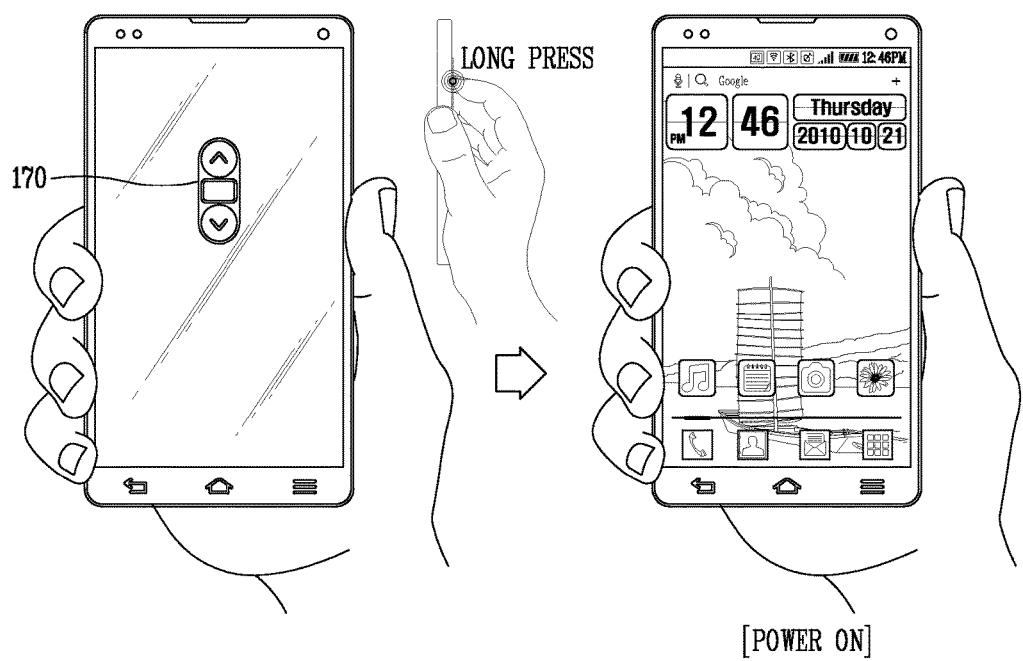

FIGS. 27A and 27B are views illustrating an embodiment of turning on or off the display unit using the rear input unit.

As illustrated in FIG. 27A, when a user presses the central button 233 of the rear input unit 232 on a standby screen or lock screen, an indicator 169 indicating a function that can be currently carried out by the rear input unit on the screen, namely, power-off function, is displayed. Subsequently, when the user long presses the central button 233 of the rear input unit 232, a power-off related menu is displayed on the display unit 251, and when a power-off item is selected on the menu, the display unit 251 is powered off.

Furthermore, as illustrated in FIG. 27B, when a user presses the central button 233 of the rear input unit 232 in a power-off state, an indicator 170 indicating a function currently executable on the screen with the rear input unit, namely, a power-on function, is displayed. If the user long presses the central button 233 of the rear input unit 232, then fingerprint recognition is automatically carried out and displayed on the standby screen.

Furthermore, according to the embodiments of the present disclosure, a first and a second input using a press, a touch and a scrolling of each button (center, top/bottom button) of the rear input unit may be merely designated for the description, but their input sequence may be changed according to the necessity.

As described above, the present disclosure may set multi-functions to the rear input unit, and determine a currently executable function by a user's interaction applied to the rear input unit and a type of content displayed on the screen, and then guide it to a front display unit, thereby having an effect of allowing the user to easily check which button is currently inputted and which function is selected to be executable without directly viewing a rear manipulation.

Furthermore, the present disclosure may guide a rear input unit at the same position of the front display unit corresponding to the rear input unit to display the position of a finger, thereby having an advantage of allowing the user to easily manipulate the manipulation of the rear input unit without directly viewing the rear input unit.

In addition, the present disclosure may allocate a plurality of functions executable by the rear input unit on a current screen for each direction to guide them on the front display unit, and recognize the direction of a subsequent input to the rear input unit to execute a function allocated to the relevant direction to allow allowing the user to perform any function with the rear input unit, and check which button should be manipulated to select his or her desired function, thereby having an effect capable of easily and conveniently executing his or her desired function without directly viewing the rear input unit.

According to an embodiment of the present disclosure, the foregoing method may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented via a carrier wave (for example, transmission via the Internet). The computer may include the controller of the terminal.

The configurations and methods according to the above-described embodiments will not be applicable in a limited way to the foregoing mobile terminal and rear input unit operation method of the same, and all or part of each embodiment may be selectively combined and configured to make various modifications thereto.

What is claimed is:

1. A mobile terminal, comprising:
a front display unit disposed on a front side of the mobile terminal to display content on a screen;
a rear input unit disposed on a rear side of the mobile terminal to sense a user input, wherein the rear input unit comprises a first button and a second button; and
a hardware controller operably coupled to the front display unit and the rear input unit and configured to:
cause the front display unit to display a guide section on the screen in response to a first user input applied to the first button on the rear side, wherein the guide section is for visually guiding at least one function currently executable at the mobile terminal by using at least one of the first button or the second button on the rear side or by directly touching the guide section on the screen,
wherein the guide section on the screen comprises a first indicator corresponding to the first button on the rear side and a second indicator corresponding to the second button on the rear side, the first indicator displayed at a first position on the screen corresponding to a position of the first button on the rear side and the second indicator displayed at a second position on the screen corresponding to a position of the second button on the rear side, and the first indicator displayed distinguishably from the second indicator to indicate that the first user input is being received via the first button on the rear side;
wherein the at least one function is determined based on a type of the currently displayed content on the screen and a type of the first user input applied to the first button on the rear side, the type of the displayed content comprises a standby screen, a text, an image, a webpage, or a function application screen of the mobile terminal; and the type of the first user input is one of a short or long press, a short touch, a long touch, or a scrolling; and
execute a preset control command associated with the currently displayed content on the screen in response to a second user input applied to the first indicator or second indicator in the guide section displayed on the screen, wherein the second user input is received on the screen while the first user input is applied to the first button on the rear side of the mobile terminal.

2. The mobile terminal of claim 1, wherein the rear input unit is a push button or touch button or a push button or touch button provided with a fingerprint recognition sensor.

3. The mobile terminal of claim 1, wherein each of the first indicator and the second indicator has a shape and size corresponding to a respective shape and size of the first button and the second button.

4. The mobile terminal of claim 1, wherein the hardware controller is further configured to:
determine one function based on a type of the displayed content and the first user input among multi-functions set to the rear input unit;

cause the front display unit to display information related to the one function on the guide section; and perform an operation related to the function in response to the second user input received while the first user input is maintained at the first button.

5. The mobile terminal of claim 4, wherein the first user input comprises pressing the first button.

6. The mobile terminal of claim 1, wherein the hardware controller is further configured to cause the front display unit to display an icon indicating a selection direction of the at least one function on the guide section.

7. The mobile terminal of claim 1, wherein the hardware controller is further configured to:
allocate functions executable on current content to each direction among multi-functions set to the rear input unit to display the functions on the guide section while the first user input is applied to the first button; and
execute a function corresponding to a direction of the second user input when the second user input is applied to the second indicator while the first user input is being applied to the first button.

8. The mobile terminal of claim 7, wherein the first user input comprises pressing the first button and the second user input comprises touching the second indicator while the first button is being pressed.

9. The mobile terminal of claim 7, wherein the first user input is a press or touch input applied to the first button and the second user input is a scroll input applied to the second indicator.

10. A method for operating a mobile terminal, the method comprising:
displaying content on a front display unit disposed on a front side of the mobile terminal;
sensing an input applied to a rear input unit disposed on a rear side of the mobile terminal, wherein the rear input unit comprises a first button and a second button;
displaying, on the front display unit, a guide section in response to a first user input received via the first button on the rear side, wherein the guide section is for visually guiding at least one function currently executable at the mobile terminal by using at least one of the first button or the second button on the rear side or by directly touching the guide section on the screen, wherein the guide section comprises a first indicator corresponding to the first button on the rear side and a second indicator corresponding to the second button on the rear side, the first indicator displayed at a first position of the front display unit corresponding to a position of the first button on the rear side and the second indicator displayed at a second position of the front display unit corresponding to a position of the second button on the rear side, and the first indicator displayed distinguishably from the second indicator to indicate that the first user input is being received via the first button on the rear side;

wherein the at least one function is determined based on a type of the currently displayed content and a type of the first user input applied to the first button on the rear side, the type of the displayed content comprises a standby screen, a text, an image, a webpage, or a function application screen of the mobile terminal; and the type of the first user input is one of a short or long press, a short touch, a long touch, or a scrolling; and executing a preset control command associated with the currently displayed content in response to a second user input received via the first indicator or second indicator in the guide section, wherein the second user input is received while the first user input is received via the first button on the rear side of the mobile terminal.

11. The method of claim 10, wherein the rear input unit is a push button or touch button or a push button or touch button provided with a fingerprint recognition sensor.

12. The method of claim 10, wherein each of the first indicator and the second indicator has a shape and size corresponding to a respective shape and size of the first button and the second button.

13. The method of claim 10, wherein the first user input comprises pressing the first button.

14. The method of claim 10, wherein the first user input comprises pressing the first button and the second user input comprises touching the second indicator while the first button is being pressed.

15. The method of claim 10, wherein the first input is a press or touch input applied to the first button and the second input is a scroll input applied to the second indicator.

* * * * *